(12) United States Patent
Okada et al.

(10) Patent No.: US 9,235,291 B2
(45) Date of Patent: *Jan. 12, 2016

(54) DISPLAY DEVICE INCLUDING OPTICAL SENSORS

(75) Inventors: Atsushi Okada, Osaka (JP); Kazuhiro Maeda, Osaka (JP); Ichiroh Shiraki, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 736 days.

This patent is subject to a terminal disclaimer.

(21) Appl. No.: 13/517,987

(22) PCT Filed: Nov. 15, 2010

(86) PCT No.: PCT/JP2010/070272
§ 371 (c)(1),
(2), (4) Date: Jun. 21, 2012

(87) PCT Pub. No.: WO2011/077855
PCT Pub. Date: Jun. 30, 2011

(65) Prior Publication Data
US 2012/0256883 A1 Oct. 11, 2012

(30) Foreign Application Priority Data

Dec. 25, 2009 (JP) ................................. 2009-294923

(51) Int. Cl.
*G06F 3/038* (2013.01)
*G06F 3/042* (2006.01)
(Continued)

(52) U.S. Cl.
CPC .............. *G06F 3/042* (2013.01); *G06F 1/3203* (2013.01); *G06F 3/0412* (2013.01);
(Continued)

(58) Field of Classification Search
CPC ..... G09G 3/34; G09G 3/3406; G09G 3/3648; G09G 3/20; G09G 3/36; G09G 2300/144; G09G 2300/145; G06F 3/042; G06F 3/0412; G06F 3/0421
USPC ...................................................... 345/76–83
See application file for complete search history.

(56) References Cited

U.S. PATENT DOCUMENTS

2006/0138983 A1 6/2006 Lee et al.
2006/0170658 A1 8/2006 Nakamura et al.
(Continued)

FOREIGN PATENT DOCUMENTS

JP 2006-201763 A 8/2006
JP 2006-243927 A 9/2006

OTHER PUBLICATIONS

Official Communication issued in International Patent Application No. PCT/JP2010/070272, mailed on Dec. 7, 2010.

*Primary Examiner* — Kenneth Bukowski
(74) *Attorney, Agent, or Firm* — Keating & Bennett, LLP

(57) ABSTRACT

In a display device with optical sensors, a mode control portion (24) determines a mode to be a normal mode in which to operate a recognition processing portion (22) or a standby mode in which to stop the recognition processing portion (22) from operating. In transition from the normal mode to the standby mode, a decimated image memory (25) stores a decimated image having a smaller number of pixels than a scan picture. The mode control portion (24) performs pixel-by-pixel comparison between the stored decimated image and an image supplied anew, which is obtained by averaging decimated images for two consecutive frames, and causes transition from the standby mode to the normal mode when the number of pixels whose difference in pixel values is greater than or equal to a first threshold is greater than or equal to a second threshold. As a result, it is rendered possible to inhibit erroneous determination and promptly detect a touch position after a quick exit from the standby mode.

11 Claims, 12 Drawing Sheets

(51) Int. Cl.
*G06F 1/32* (2006.01)
*G06F 3/041* (2006.01)
*G09G 3/36* (2006.01)

(52) U.S. Cl.
CPC ........... *G06F 3/0416* (2013.01); *G09G 3/3648* (2013.01); *G09G 2310/04* (2013.01); *G09G 2330/022* (2013.01); *G09G 2360/144* (2013.01)

(56) References Cited

U.S. PATENT DOCUMENTS

| | | | |
|---|---|---|---|
| 2008/0231564 A1* | 9/2008 | Harada et al. | 345/81 |
| 2009/0207154 A1* | 8/2009 | Chino | 345/175 |
| 2012/0287093 A1* | 11/2012 | Gotoh et al. | 345/204 |

* cited by examiner

DISPLAY DEVICE INCLUDING OPTICAL SENSORS

TECHNICAL FIELD

The present invention relates to display devices, particularly to a display device having a plurality of optical sensors provided on a display panel.

BACKGROUND ART

Recent years have seen widespread use of electronic equipment which can be operable by touching its screen with a finger, a pen, or the like. In a known method for detecting a touch position in a display screen, a plurality of optical sensors are provided on a display panel and used to sense a projected or reflected image formed by a finger or suchlike approaching the screen. In another known method, to detect a touch position with high accuracy for any display data, a display device is provided with an infrared backlight for emitting infrared light, and a reflected image formed by infrared light is sensed using optical sensors.

In addition to the infrared backlight, such a display device with optical sensors is provided with, for example, an A/D converter for converting signals being read from the optical sensors into digital signals and a recognition processing portion for obtaining touch positions on the basis of the resultant digital signals. Consequently, the display device with optical sensors has a problem of its power consumption being higher than display devices without optical sensors.

Therefore, in one conceivable method for reducing power consumption, the display device with optical sensors has a normal mode and a standby mode set therefor, and in the standby mode, circuits can be stopped from operating, or their operation can be slowed, with the recognition processing portion being deactivated. In relation to this, Japanese Laid-Open Patent Publication No. 2006-201763 describes a display device having a photo-sensitive portion and a touch-sensitive portion provided on a display panel, in which, depending on a determination based on an output signal of the touch-sensitive portion, transition to the standby mode takes place when no contact has been made for a predetermined period of time, and transition to the normal mode takes place when some contact has been made.

CITATION LIST

Patent Document

Patent Document 1: Japanese Laid-Open Patent Publication No. 2006-201763

SUMMARY OF THE INVENTION

Problems to be Solved by the Invention

However, in the display device described in Japanese Laid-Open Patent Publication No. 2006-201763, when the touch-sensitive portion senses a finger, the standby mode transitions to the normal mode. In other words, the display device remains in the standby mode when the finger is approaching the screen unless the finger touches the screen. Accordingly, this display device has a problem of significant time being taken until a touch position is detected after an exit from the standby mode, because the timing of transition from the standby mode to the normal mode is late.

In this regard, the standby mode can be promptly exited by the photo-sensitive portion sensing the finger, but with the standby mode being maintained, it is difficult to determine whether or not the photo-sensitive portion has sensed the finger, and such a determination is more difficult particularly in a low-luminance environment because the photo-sensitive portion is necessitated to sense a smaller change in luminance. Specifically, image display is performed even in the standby mode, and therefore, particularly in a low-luminance environment, erroneous determination readily occurs due to noise caused by image display.

Therefore, an objective of the present invention is to provide a display device with optical sensors which is capable of promptly detecting a touch position by inhibiting erroneous determination and quickly exiting the standby mode.

Solution to the Problems

A first aspect of the present invention is directed to a display device provided with a plurality of optical sensors, comprising:
a display panel including two-dimensionally arranged pixel circuits and optical sensors;
a driver circuit for performing operations of writing signals to the pixel circuits in accordance with display data provided at least every unit period and reading signals from the optical sensors in accordance with amounts of received light;
a recognition processing portion for performing recognition processing on a recognition target image based on signals being read from the optical sensors, and outputting coordinate data indicating a position of a sensing target;
a mode control portion for determining whether a mode is normal or standby and causing the recognition processing portion to operate in the normal mode or stop operating in the standby mode; and
an image storage portion for storing a first comparison image based on signals being read from the optical sensors in transition from the normal mode to the standby mode,
wherein,
the mode control portion causes transition from the standby mode to the normal mode when a unit period at the time of storage of the first comparison image is considered as a first unit period and a second comparison image based on signals being read from the optical sensors in at least one subsequent odd-number unit period changes to a predetermined degree or more from the first comparison image.

In a second aspect of the present invention, based on the first aspect of the invention, the mode control portion obtains the second comparison image by averaging two or more images based on signals being read from the optical sensors respectively in the at least one odd-number unit period and at least one even-number unit period.

In a third aspect of the present invention, based on the second aspect of the invention, the mode control portion obtains the second comparison image by averaging two images based on signals being read from the optical sensors respectively in two consecutive unit periods.

In a fourth aspect of the present invention, based on the first aspect of the invention, the mode control portion determines whether or not the second comparison image has changed from the first comparison image every odd-number unit period, the second comparison image being an image based on signals being read from the optical sensors in the odd-number unit period.

In a fifth aspect of the present invention, based on the fourth aspect of the invention, the image storage portion stores a third comparison image based on signals being read from the optical sensors in a second unit period subsequent to the first unit period, and the mode control portion causes transition from the standby mode to the normal mode when a fourth comparison image is determined to have changed from the third comparison image to a predetermined degree or more and the second comparison image is determined to have changed from the first comparison image to a predetermined degree or more, the fourth comparison image being an image based on signals being read from the optical sensors in an even-number unit period.

In a sixth aspect of the present invention, based on the first aspect of the invention, the driver circuit outputs an identification bit indicating whether the unit period is even- or odd-numbered, and the mode control portion identifies whether an image based on signals being read from the optical sensors is for an odd-number unit period, on the basis of the identification bit outputted by the driver circuit.

In a seventh aspect of the present invention, based on the first aspect of the invention, the mode control portion performs pixel-by-pixel comparison between the first comparison image and the second comparison image, and causes transition from the standby mode to the normal mode when the number of pixels whose difference in pixel values is greater than or equal to a first threshold is greater than or equal to a second threshold.

In an eighth aspect of the present invention, based on the first aspect of the invention, each of the comparison images has a smaller number of pixels than the recognition target image.

In a ninth aspect of the present invention, based on the eighth aspect of the invention, the comparison images are images each being obtained by decimating the pixels from the recognition target image.

In a tenth aspect of the present invention, based on the first aspect of the invention, the driver circuit reads a lesser quantity of signals from the optical sensors in the standby mode than in the normal mode in accordance with a result of determination by the mode control portion.

An eleventh aspect of the present invention is directed to a method for controlling a display device provided with a display panel including two-dimensionally arranged pixel circuits and optical sensors, and a recognition processing portion for performing recognition processing on a recognition target image based on signals being read from the optical sensors and outputting coordinate data indicating a position of a sensing target, the method comprising:

a step of writing signals to the pixel circuits in accordance with display data;

a step of reading signals from the optical sensors in accordance with amounts of received light;

a step of determining whether a mode is normal or standby;

a step of activating the recognition processing portion in the normal mode or stopping the recognition processing portion from operating in the standby mode; and a step of storing a first comparison image based on signals being read from the optical sensors in transition from the normal mode to the standby mode, wherein, in the step of determining the mode, transition from the standby mode to the normal mode takes place when a unit period at the time of storage of the first comparison image is considered as a first unit period and a second comparison image based on signals being read from the optical sensors in at least one subsequent odd-number unit period changes to a predetermined degree or more from the first comparison image.

Effect of the Invention

According to the first or eleventh aspect of the present invention, it is determined whether the mode is normal or standby, and the recognition processing portion is stopped from operating in the standby mode, thereby reducing power consumption of the display device. Moreover, when the comparison image based on signals being read from the optical sensors changes to a predetermined degree or more after transition to the standby mode, the mode transitions to normal, so that the transition to the normal mode can take place before a sensing target touches the screen. Accordingly, a touch position can be promptly detected after a quick exit from the standby mode. Moreover, in the case where a unit period at the time of storage of the first comparison image is taken as a first unit period, when a second comparison image based on signals being read from the optical sensors in at least one subsequent odd-number unit period changes to a predetermined degree or more from the first comparison image, transition from the standby mode to the normal mode takes place, and therefore, erroneous determination can be inhibited even when the amount of light detected by the optical sensors varies between unit periods (typically, as a result of potential fluctuations caused by drive for display).

According to the second aspect of the present invention, the second comparison image is obtained by averaging two or more images, and therefore, deviations in the amount of light detected by the optical sensors due to potential fluctuations or suchlike can be averaged between even-number and odd-number unit periods, thereby reducing or eliminating erroneous sensing due to the deviations.

According to the third aspect of the present invention, two images obtained in two consecutive unit periods are averaged, and therefore, deviations due to potential fluctuations or suchlike can be completely cancelled out, or considerably reduced, between consecutive even-number and odd-number unit periods, thereby significantly reducing or eliminating erroneous sensing due to the deviations.

According to the fourth aspect of the present invention, the second comparison image is an image based on signals being read from the optical sensors in an odd-number unit period with the same parity as the first comparison image stored in the first unit period, and therefore, images to be compared are similar or equal in amounts or directions of the deviations due to potential fluctuations or suchlike, which makes it possible for a simplified configuration to reduce or eliminate erroneous sensing.

According to the fifth aspect of the present invention, the image storage portion stores the first and third comparison images, respectively, in the first and second unit periods, and the second or fourth comparison image based on signals being read from the optical sensors in a unit period with the same parity as any of the stored images is used for comparison, so that erroneous sensing due to noise as mentioned earlier can be reliably reduced or eliminated.

According to the sixth aspect of the present invention, it is identified whether or not an image based on signals being read from the optical sensors is for an odd-number unit period on the basis of an identification bit indicating the unit period is even- or odd-numbered, and therefore, erroneous sensing can be reduced or eliminated with a simplified configuration using a general identification bit.

According to the seventh aspect of the present invention, two comparison images are compared pixel-by-pixel, and when the number of pixels whose difference in pixel values is greater than or equal to a first threshold is greater than or equal to a second threshold, transition to the normal mode takes place, so that the mode is caused to transition to normal before a sensing target touches the screen. Thus, a touch position can be promptly detected after a quick exit from the standby mode.

According to the eighth aspect of the present invention, the mode determination process is performed using the comparison images each having a smaller number of pixels than the recognition target image, so that the size of memory and the amount of computation required for the mode determination process can be reduced.

According to the ninth aspect of the present invention, the comparison images are images each obtained by decimating the pixels from the recognition target image, so that the comparison images can be readily generated without performing processing for calculating an average value and other processing.

According to the tenth aspect of the present invention, the driver circuit is slowed in operation in the standby mode, making it possible to reduce power consumption of the display device while generating the comparison images required for the mode determination process.

MODES FOR CARRYING OUT THE INVENTION

1. First Embodiment 1.1 Overall Configuration and Operation

Figure 1:
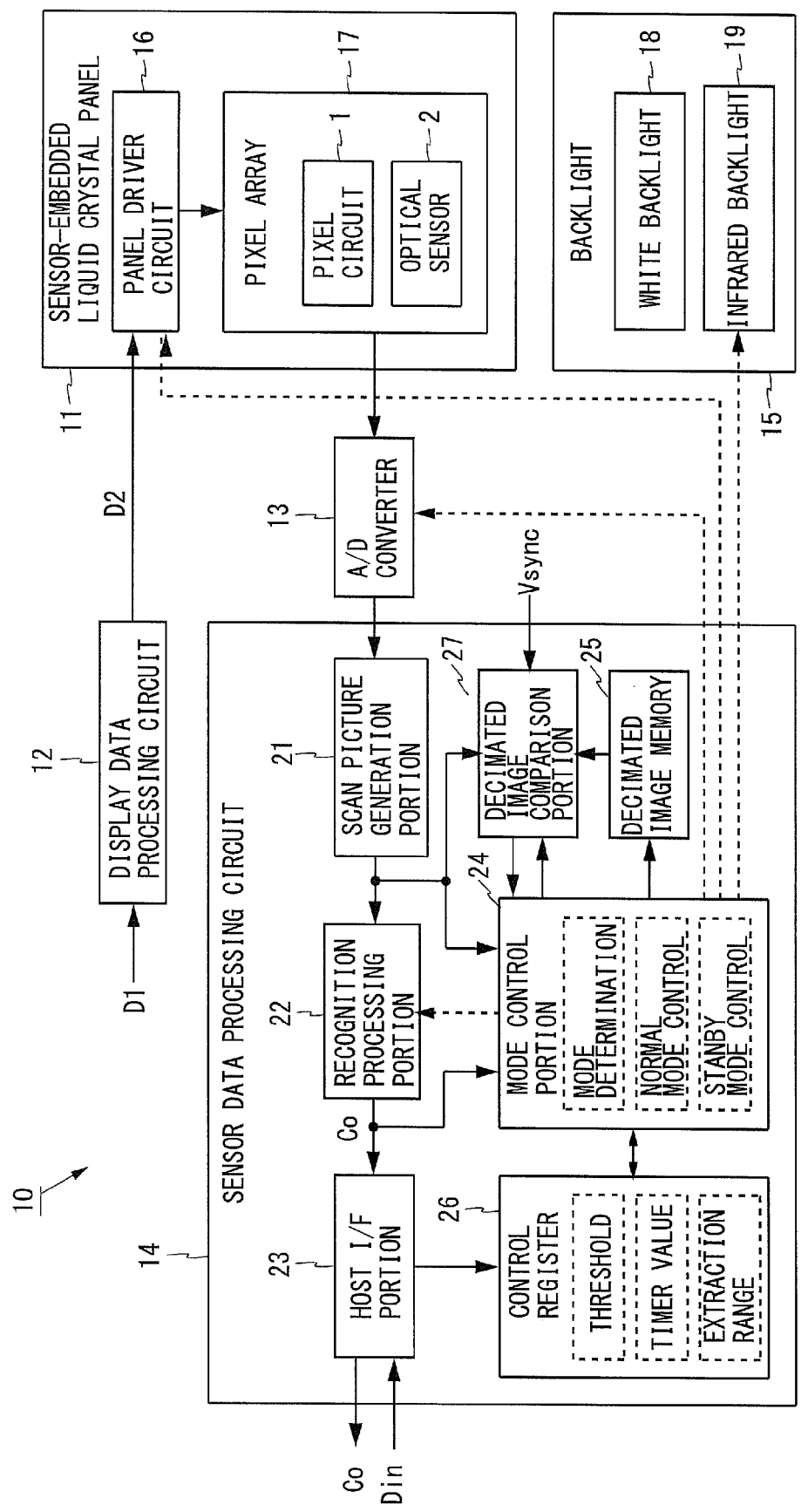
FIG. 1 is a block diagram illustrating the configuration of a liquid crystal display device according to a first embodiment of the present invention.

FIG. 1 is a block diagram illustrating the configuration of a liquid crystal display device according to a first embodiment of the present invention. The liquid crystal display device 10 shown in FIG. 1 is provided with a sensor-embedded liquid crystal panel 11 (hereinafter, simply referred to as a liquid crystal panel), a display data processing circuit 12, an A/D converter 13, a sensor data processing circuit 14, and a backlight 15. The liquid crystal panel 11 includes a panel driver circuit 16 and a pixel array 17. The pixel array 17 has a plurality of pixel circuits 1 and a plurality of optical sensors 2 arranged two-dimensionally.

The liquid crystal display device 10 externally receives display data $D_1$. The display data processing circuit 12 performs as necessary color correction processing, frame-rate conversion processing, or the like, on the display data $D_1$, and outputs display data $D_2$. The panel driver circuit 16 writes voltages, which correspond to the display data $D_2$, to the pixel circuits 1. As a result, the liquid crystal panel 11 displays an image based on the display data $D_2$.

The backlight 15 illuminates the back of the liquid crystal panel 11 with light (backlight) on the basis of a source voltage supplied by a backlight power source circuit (not shown). The backlight 15 includes a white backlight 18 for emitting white light and an infrared backlight 19 for emitting infrared light. The white backlight 18 is provided for image display, and the infrared backlight 19 is provided for touch position detection.

In addition to the operation of writing voltages to the pixel circuits 1, the panel driver circuit 16 performs an operation of reading voltages from the optical sensors 2 in accordance with amounts of received light. Output signals of the optical sensors 2 (hereinafter, referred to as sensor output signals) are provided to the outside of the liquid crystal panel 11. The A/D converter 13 converts the sensor output signals, which are analog, to digital signals.

The sensor data processing circuit 14 includes a scan picture generation portion 21, a recognition processing portion 22, a host interface portion 23 (hereinafter, referred to as a host I/F portion 23), a mode control portion 24, decimated image memory 25, a control register 26, and a decimated image comparison portion 27.

The scan picture generation portion 21 generates a digital image (hereinafter, referred to as a scan picture) on the basis of digital signals outputted by the A/D converter 13. The scan picture might include an image of an object to be sensed in the vicinity of the surface of the liquid crystal panel 11 (e.g., a finger, a pen, or the like; hereinafter, referred to as a target). The recognition processing portion 22 performs recognition processing on the scan picture to sense the target, thereby obtains the position of the target within the scan picture, and then outputs coordinate data Co indicating a touch position. The coordinate data Co outputted by the recognition processing portion 22 is provided to a host (not shown) via the host I/F portion 23.

Figure 2:
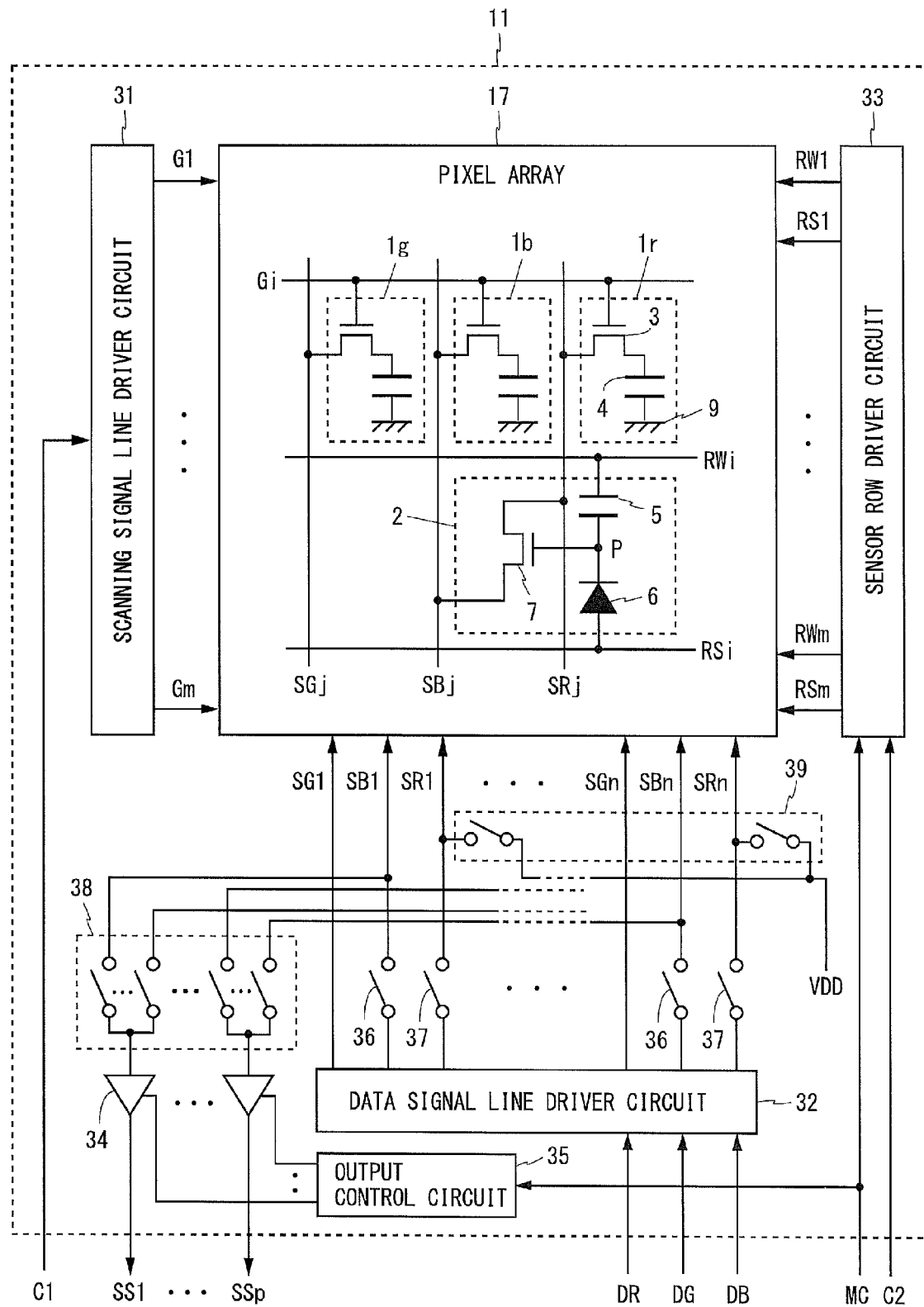
FIG. 2 is a block diagram illustrating a detailed configuration of a liquid crystal panel of the liquid crystal display device according to the embodiment.

FIG. 2 is a block diagram illustrating a detailed configuration of the liquid crystal panel 11. The pixel array 17 includes m scanning signal lines $G_1$ to $G_m$, 3n data signal lines $S_{R1}$ to $S_{Rn}$, $S_{G1}$ to $S_{Gn}$, and $S_{B1}$ to $S_{Bn}$, and (m×3n) pixel circuits 1, as shown in FIG. 2. In addition, the pixel array 17 includes (m×n) optical sensors 2, m sensor readout lines $RW_1$ to $RW_m$, and $m$ sensor reset lines $RS_1$ to $RS_m$.

The scanning signal lines $G_1$ to $G_m$ are arranged in parallel with one another. The data signal lines $S_{R1}$ to $S_{Rn}$, $S_{G1}$ to $S_{Gn}$, and $S_{B1}$ to $S_{Bn}$ are arranged in parallel with one another and perpendicularly to the scanning signal lines $G_1$ to $G_m$. The sensor readout lines $RW_1$ to $RW_m$ and the sensor reset lines $RS_1$ to $RS_m$ are arranged in parallel with the scanning signal lines $G_1$ to $G_m$.

The pixel circuits 1 are provided one by one near the intersections of the scanning signal lines $G_1$ to $G_m$ and the data signal lines $S_{R1}$ to $S_{Rn}$, $S_{G1}$ to $S_{Gn}$, and $S_{B1}$ to $S_{Bn}$. The pixel circuits 1 are arranged two-dimensionally as a whole, with m of them in the direction of each column (in FIG. 2, vertically) and 3n of them in the direction of each row (in FIG. 2, horizontally). The pixel circuits 1 are classified into R pixel circuits $1_r$, G pixel circuits $1_g$, and B pixel circuits $1_b$ in accordance with the colors of color filters provided thereon. These three types of pixel circuits are arranged rowwise in the sequence of G, B, R, and each set of three forms a single pixel.

Each of the pixel circuits 1 includes a TFT (thin-film transistor) 3 and a liquid crystal capacitance 4. The TFT 3 is made of, for example, polycrystalline silicon, and the liquid crystal capacitance 4 is formed by a liquid crystal layer sandwiched between two electrodes to be described later. The TFT 3 has a gate terminal connected to a scanning signal line $G_i$ (where i is an integer between 1 and m), a source terminal connected to a data signal line $S_{Rj}$, $S_{Gj}$, or $S_{Bj}$ (where j is an integer between 1 and n), and a drain terminal connected to a pixel electrode, which is one of the electrodes of the liquid crystal capacitance 4. The other electrode of the liquid crystal capacitance 4 is connected to a common electrode provided in common for pixels. The common electrode has a common electrode voltage applied thereto. Hereinafter, the data signal lines $S_{R1}$ to $S_{Rn}$ connected to R pixel circuits $1_r$ will be referred to as R data signal lines, and the data signal lines $S_{B1}$ to $S_{Bn}$ connected to B pixel circuits $1_b$ will be referred to as B data signal lines. Note that the pixel circuits 1 may include auxiliary capacitances.

Each of the pixel circuits 1 has its light transmittance (subpixel brightness) determined by a voltage written thereto. To write a voltage to the pixel circuit 1 connected to the scanning signal line $G_i$ and the data signal line $S_{Xj}$ (where X is R, G, or B), a high-level voltage (a voltage to turn on the TFT 3) is applied to the scanning signal line $G_i$, and a voltage to be written is applied to the data signal line $S_{Xj}$. By writing a voltage to the pixel circuit 1 in accordance with display data $D_2$, the subpixel brightness can be set to a desired level.

Here, in general liquid crystal display devices, polarity inversion drive is performed to suppress deterioration of liquid crystal and maintain display quality. Concretely, the present embodiment employs a so-called line inversion drive system, in which the polarity of a voltage applied to the liquid crystal in pixels is reversed per scanning signal line and also per frame. Note that, instead of employing the line inversion drive system, a frame inversion drive system, which is a drive system in which the polarity of a voltage applied to the liquid crystal in pixels is only reversed per frame, or a so-called dot inversion drive system in which the reversal is performed per scanning signal line and also per video signal line (the reversal also being performed per frame) may be employed.

Furthermore, in the present embodiment, to suppress voltage swing of video signal lines, the potential of the common electrode is also changed in accordance with the polarity inversion drive. Accordingly, even in the case where a given pixel is displayed with the same tone in an even-number frame and an odd-number frame, the potential of a pixel electrode corresponding to that pixel varies significantly. This causes the optical sensor 2 to detect noise. Details will be described later.

The optical sensors 2, each including a capacitor 5, a photodiode 6, and a sensor preamplifier 7, are provided on a pixel-by-pixel basis. The capacitor 5 has one electrode connected to a cathode terminal of the photodiode 6 (hereinafter, this connecting point will be referred to as a node P). The capacitor 5 has the other electrode connected to the sensor readout line $RW_i$, and the photodiode 6 has an anode terminal connected to the sensor reset line $RS_i$. The sensor preamplifier 7 is a TFT having a gate terminal connected to the node P, a drain terminal connected to the R data signal line $S_{Rj}$, and a source terminal connected to the B data signal line $S_{Bj}$.

To sense the amount of light with the optical sensor 2 connected to the sensor readout line $RW_i$, the B data signal line $S_{Bj}$, etc., a predetermined voltage (here, 0V) is initially applied to the sensor readout line $RW_i$ and the sensor reset line $RS_i$. As a result, forward current flows through the photodiode 6, thereby resetting the charge stored in the capacitor 5. Thereafter, when a predetermined negative voltage is applied to the sensor reset line $RS_i$, the photodiode 6 is reversely biased. Accordingly, when light is incident on the photodiode 6, current flows through the photodiode 6 in accordance with the amount of incident light, so that the voltage at the node P falls in an amount corresponding to the flowing current. Thereafter, by applying a source voltage VDD to the R data signal line $S_{Rj}$ after the sensor preamplifier 7 has its gate voltage raised to a threshold or higher by increasing the voltage at the node P through application of a high voltage to the sensor readout line $RW_i$, the voltage at the node P is amplified by the sensor preamplifier 7, and then outputted to the B data signal line $S_{Bj}$. Thus, the amount of light sensed by the optical sensor 2 can be obtained on the basis of the voltage on the B data signal line $S_{Bj}$.

However, the pixel electrode is present in the vicinity of the optical sensor 2, and a parasitic capacitance is present between the optical sensor 2 and the node P connected to the cathode terminal of the photodiode 6. The potential of the pixel electrode might vary significantly between even-number and odd-number frames. Moreover, the common electrode is also present in the vicinity of the optical sensor 2, and a parasitic capacitance is present between the optical sensor 2 and the node P as well. Furthermore, the potential of the common electrode similarly varies between the even-number and odd-number frames.

For example, in normally-black liquid crystal display devices, for white display with the maximum tone, the potential applied to the pixel electrode changes in the opposite direction to the potential of the common electrode to maximize the difference in potential between the pixel electrode and the common electrode, and for black display with the minimum tone, the potential applied to the pixel electrode changes in the same direction as the potential of the common electrode to minimize the difference in potential between the pixel electrode and the common electrode. Accordingly, even when the same image is displayed in two consecutive frames, pixel electrodes corresponding to pixels for white display and pixel electrodes corresponding to pixels for black display have their potentials changed in opposite directions between an even-number frame and an odd-number frame adjacent thereto, so that the difference in the amount of potential fluctuations is maximized. Such potential fluctuations cause the potential of the node P to change via the parasitic capacitance in various manners. Accordingly, even if the same amount of light is sensed, the potential of the node P might vary between the even-number frame and the odd-number frame.

In this manner, the voltage of the node P, which falls when light is incident on the photodiode 6 after the aforementioned constant voltage is provided, might vary between the even-number frame and the odd-number frame even when the same amount of light is incident on the photodiode 6, and the amount of light sensed by the optical sensor 2, which is obtained on the basis of the voltage on the B data signal line $S_{Bj}$, includes noise corresponding to the amount of fluctuations mentioned above. Such noise readily causes erroneous sensing in a low-luminance environment. The configuration of the present embodiment can eliminate such erroneous sensing. Details will be described later.

Provided around the pixel array 17 are a scanning signal line driver circuit 31, a data signal line driver circuit 32, a sensor row driver circuit 33, p (where p is an integer between 1 and n) sensor output amplifiers 34, an output control circuit 35, and a plurality of switches 36 to 39. These circuits constitute the panel driver circuit 16 in FIG. 1.

The data signal line driver circuit 32 has 3n output terminals corresponding to the 3n data signal lines. The switches 36 are provided between the B data signal lines $S_{B1}$ to $S_{Bn}$ and n output terminals corresponding thereto, and the switches 37 are provided one by one between the R data signal lines $S_{R1}$ to $S_{Rn}$ and n output terminals corresponding thereto. The B data signal lines $S_{B1}$ to $S_{Bn}$ are divided into groups of p lines, and each group has one switch 38 provided between the k'th (where k is an integer between 1 and p) B data signal line and an input terminal of the k'th sensor output amplifier 34. The switches 39 are provided one by one between the R data signal lines $S_{R1}$ to $S_{Rn}$ and the source voltage VDD. For the switches 36 to 39 included in FIG. 2, the number is n each.

For the liquid crystal display device 10, one line period (one horizontal synchronization period) is divided into a display period (an effective display period) in which signals (voltage signals corresponding to display data) are written to pixel circuits while a corresponding scanning signal line is being selected and a sensor operation period from the time the scanning signal line transitions to a deselected state to the time the next scanning signal line is selected (this period being also called a blanking period), in which signals (voltage signals corresponding to amounts of received light) are read from the optical sensors, and optical sensor circuits are reset.

Here, the circuits shown in FIG. 2 operate differently in the (effective) display period and the sensor operation period within the blanking period. Specifically, in the display period, the switches 36 and 37 are on, whereas the switches 38 and 39 are off. On the other hand, in the sensor operation period, the switches 36 and 37 are off, whereas the switches 39 are on, with the switches 38 being turned on in a time-division manner such that the B data signal lines $S_{B1}$ to $S_{Bn}$ are sequentially connected to input terminals of the sensor output amplifiers 34 group by group.

In the display period, the scanning signal line driver circuit 31 and the data signal line driver circuit 32 are in operation. The scanning signal line driver circuit 31 selects one of the scanning signal lines $G_1$ to $G_m$ every line period in accordance with a timing control signal $C_1$, and applies a high-level voltage to the selected scanning signal line and a low-level voltage to the remaining scanning signal lines. The data signal line driver circuit 32 drives the data signal lines $S_{R1}$ to $S_{Rn}$, $S_{G1}$ to $S_{Gn}$, and $S_{B1}$ to $S_{Bn}$ in a line-sequential system on the basis of display data $D_R$, $D_G$, and $D_B$ outputted by the display data processing circuit 12. More specifically, the data signal line driver circuit 32 stores the display data $D_R$, $D_G$, and $D_B$ for at least one row, and applies a voltage corresponding to the display data for one row to the data signal lines $S_{R1}$ to $S_{Rn}$, $S_{G1}$ to $S_{Gn}$, and $S_{B1}$ to $S_{Bn}$ every line period. Note that the data signal line driver circuit 32 may drive the data signal lines $S_{R1}$ to $S_{Rn}$, $S_{G1}$ to $S_{Gn}$, and $S_{B1}$ to $S_{Bn}$ in a dot-sequential system.

In the sensor operation period, the sensor row driver circuit 33, the sensor output amplifiers 34, and the output control circuit 35 are in operation. The sensor row driver circuit 33 selects one of the sensor readout lines $RW_1$ to $RW_m$ and one of the sensor reset lines $RS_1$ to $RS_m$ every line period in accordance with a timing control signal $C_2$, and applies a predetermined readout voltage and a predetermined reset voltage to the selected sensor readout and the selected reset line, respectively, and a voltage different from those for the selected lines to the remaining other signal lines. The sensor output amplifiers 34 amplify voltages selected by the switches 38, and output them as sensor output signals $SS_1$ to $SS_p$. The operation of the output control circuit 35 will be described later.

Figure 3:
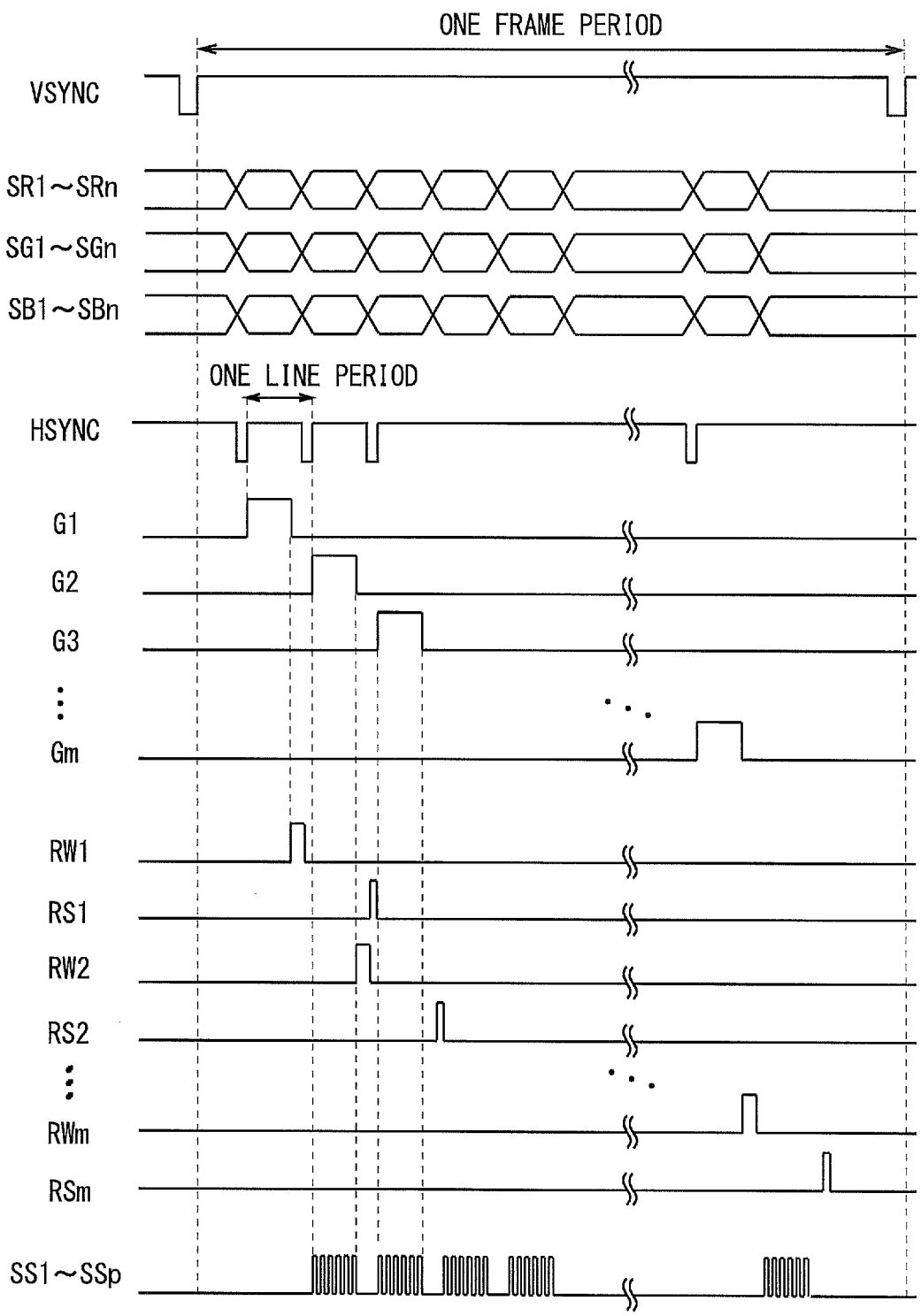
FIG. 3 is a timing chart for the liquid crystal display device according to the embodiment.

FIG. 3 is a timing chart for the liquid crystal display device 10. As shown in FIG. 3, a vertical synchronization signal $V_{sync}$ rises from low to high level every frame period. In addition, a horizontal synchronization signal $H_{sync}$ rises from low to high level every line period. Here, one line period is divided into the display period and the sensor operation period, as described earlier.

In the display period, the switches 36 and 37 are turned on, so that the data signal lines $S_{R1}$ to $S_{Rn}$, $S_{G1}$ to $S_{Gn}$, and $S_{B1}$ to $S_{Bn}$ are all connected to the data signal line driver circuit 32. In the initial display period, initially, the voltage on the scanning signal line $G_1$ turns to high level, then in the next display period, the voltage on the scanning signal line $G_2$ turns to high level, and thereafter, the voltages on the scanning signal lines $G_3$ to $G_m$ sequentially turn to high level. While the voltage on the scanning signal line $G_i$ is maintained at high level, a voltage that is to be written to the 3n pixel circuits 1 connected to the scanning signal line $G_i$ is applied to each of the data signal lines $S_{R1}$ to $S_{Rn}$, $S_{G1}$ to $S_{Gn}$, and $S_{B1}$ to $S_{Bn}$.

In the sensor operation period, the switches 39 are turned on, and the switches 38 are turned on in a time-division manner. As a result, the source voltage VDD is invariably applied to the R data signal lines $S_{R1}$ to $S_{Rn}$, and the B data signal lines $S_{B1}$ to $S_{Bn}$ are connected to the input terminals of the sensor output amplifiers 34 in a time-division manner. In the initial sensor operation period, initially, the sensor readout line $RW_1$ is selected. Note that a sensing period for detecting amounts of light extends from selection of the sensor reset line $RS_1$ in the previous frame to selection of the sensor readout line $RW_1$ in the current frame, and voltages corresponding to amounts of light received during this period are read as will be described later. In the next sensor operation period, the sensor readout line $RW_2$ and the sensor reset line $RS_1$ are selected, thereafter, the sensor readout lines $RW_3$ to $RW_m$ and the sensor reset lines $RS_2$ to $RS_{(m-1)}$ are sequentially selected pair by pair, and finally, the sensor reset line $RS_m$ is selected. A readout voltage and a reset voltage are applied to the selected sensor readout line and the selected sensor reset line, respectively. While the sensor readout line $RW_i$ and the sensor reset line $RS_i$ are being selected, voltages corresponding to the amounts of light sensed by the n optical sensors 2 connected to the sensor readout line $RW_i$ are outputted to the B data signal lines $S_{B1}$ to $S_{Bn}$. Note that in a standby mode to be described later, only some of the sensor readout lines $RW_1$ to $RW_m$ and the sensor reset lines $RS_1$ to $RS_m$ are sequentially selected pair by pair. In addition, voltages to be outputted to the B data signal lines $S_{B1}$ to $S_{Bn}$, which correspond to the amounts of light sensed by the n optical sensors 2 connected to the sensor readout line $RW_i$, might fluctuate between an even-number frame and an odd-number frame, as mentioned earlier, even when the same amount of light is provided.

Figure 4:
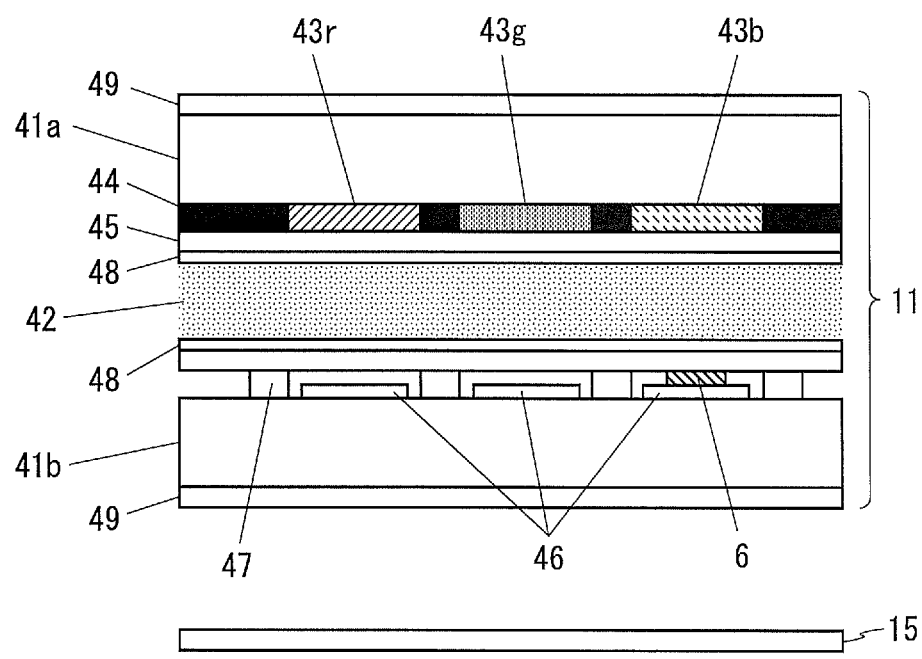
FIG. 4 is a diagram illustrating a cross section of the liquid crystal panel in the embodiment and the position of a backlight.

FIG. 4 is a diagram illustrating a cross section of the liquid crystal panel 11 and the position of the backlight 15. The liquid crystal panel 11 has a structure in which a liquid crystal layer 42 is sandwiched between two glass substrates 41a and 41b. One glass substrate 41a has provided thereon three color filters $43_r$, $43_g$, and $43_b$, a light-shielding film 44, an opposing electrode 45, etc., and the other glass substrate 41b has provided thereon pixel electrodes 46, data signal lines 47, the optical sensors 2, etc. In FIG. 4, a photodiode 6 included in one optical sensor 2 is positioned near the pixel electrode 46 above which the blue color filter $43_b$ is provided. The glass substrates 41a and 41b have orientation films 48 provided on their opposing surfaces and polarization plates 49 on the other surfaces. The liquid crystal panel 11 has two surfaces, one being a top surface on the glass substrate 41a side and the other being a bottom surface on the glass substrate 41b side.

Figure 5A:
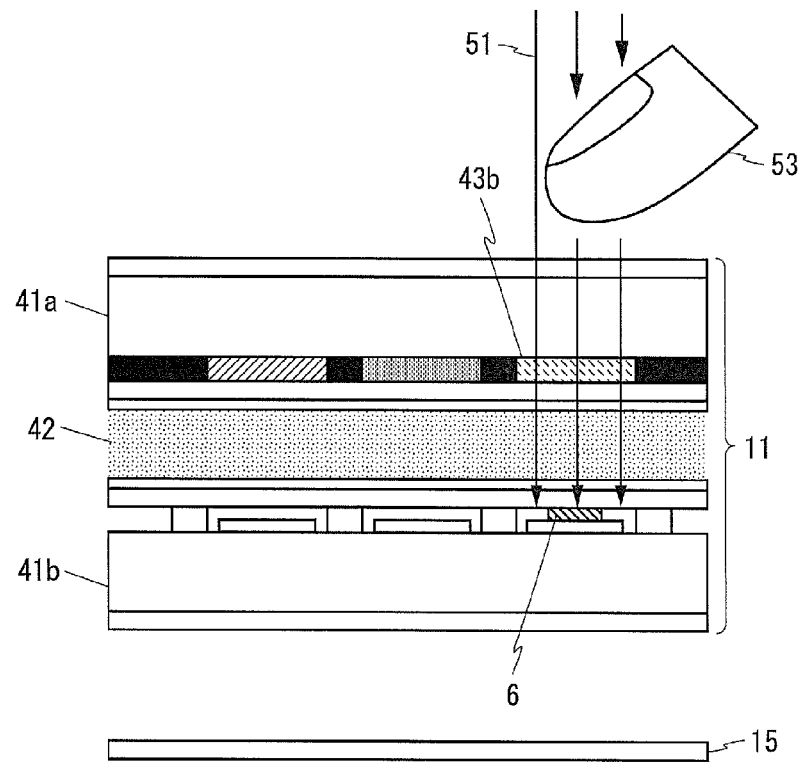
FIG. 5A is a diagram illustrating the principle of a method in which a projected image is sensed in the embodiment.
Figure 5B:
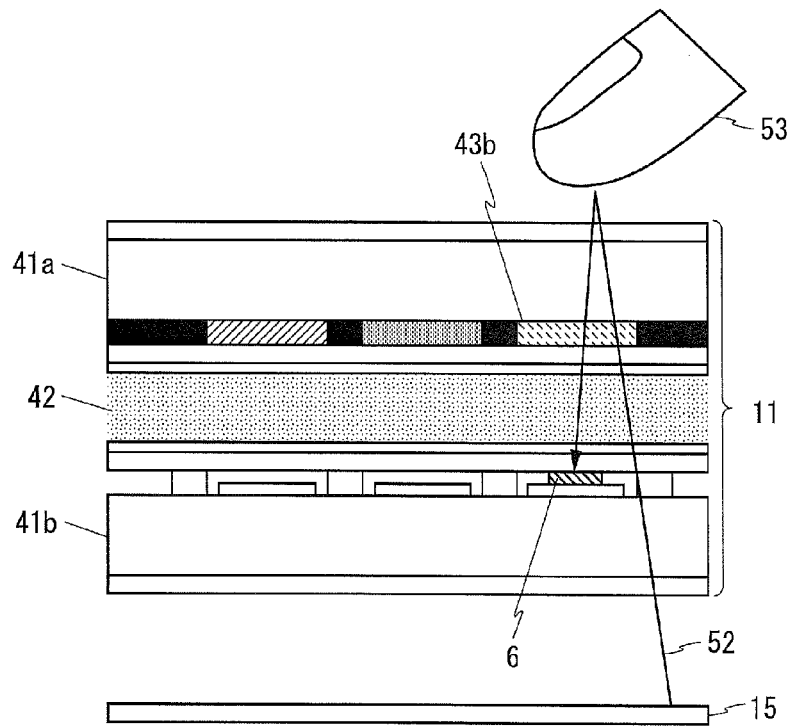
FIG. 5B is a diagram illustrating the principle of a method in which a reflected image is sensed in the embodiment.

When sensing a touch position on the display screen, the liquid crystal display device 10 uses either a method in which a projected image is sensed or a method in which a reflected image is sensed (or both a projected image and a reflected image are sensed). FIG. 5A is a diagram illustrating the principle of the method in which a projected image is sensed, and FIG. 5B is a diagram illustrating the principle of the method in which a reflected image is sensed. In the method in which a projected image is sensed (FIG. 5A), the optical sensor 2 including the photodiode 6 senses outside light 51 transmitted through the glass substrate 41a, the liquid crystal layer 42, etc. At this time, if a target 53 such as a finger is present near the top surface of the liquid crystal panel 11, the outside light 51 that should be incident on the optical sensor 2 is blocked by the target 53. Thus, a project image of the target 53 formed by the outside light 51 can be sensed using the optical sensor 2.

In the method in which a reflected image is sensed (FIG. 5B), the optical sensor 2 including the photodiode 6 senses reflection of light 52 from the backlight. More specifically, the light 52 emitted by the backlight 15 is transmitted through the liquid crystal panel 11 to the outside from the top surface of the liquid crystal panel 11. At this time, if the target 53 is present near the top surface of the liquid crystal panel 11, the light 52 is reflected by the target 53. For example, a human finger pad reflects light well. The reflection of the light 52 is transmitted through the glass substrate 41a, the liquid crystal layer 42, etc., and enters the optical sensor 2. Thus, a reflected image of the target 53 formed by the light 52 can be sensed using the optical sensor 2.

Furthermore, by using the two methods in combination, both the projected image and the reflected image can be sensed. That is, the optical sensor 2 can be used to simultaneously sense the projected image of the target 53 formed by the outside light 51 and the reflected image of the target 53 formed by the light 52.

Figure 6A:
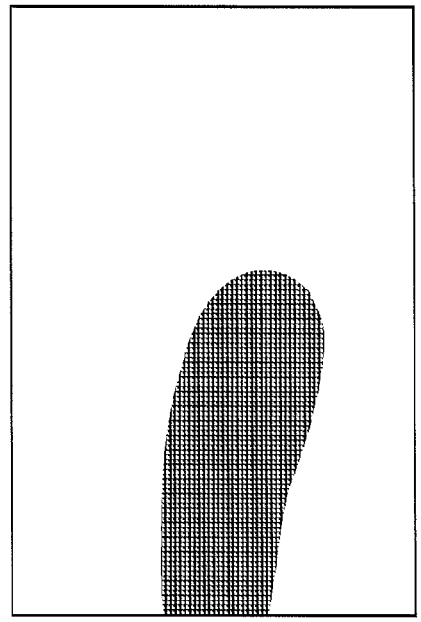
FIG. 6A is a diagram illustrating an exemplary scan picture in the embodiment, including a projected image of a finger.
Figure 6B:
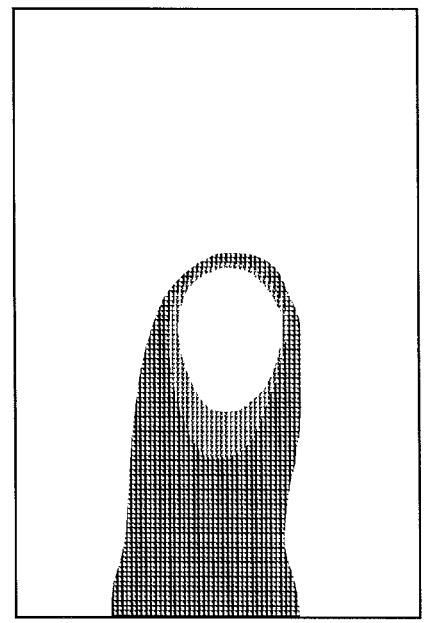
FIG. 6B is a diagram illustrating an exemplary scan picture in the embodiment, including a projected image of a finger and a reflected image of a finger pad.

FIGS. 6A and 6B are diagrams illustrating exemplary scan pictures each including a finger image. The scan picture shown in FIG. 6A includes a projected image of a finger, and the scan picture shown in FIG. 6B includes a projected image of a finger and a reflected image of a finger pad. The sensor data processing circuit 14 performs image recognition processing on such a scan picture, and outputs coordinate data Co indicating a touch position.

Hereinafter, the liquid crystal display device 10 will be described with respect to operation mode switching. The liquid crystal display device 10 has a normal mode and a standby mode to reduce power consumption, and in the standby mode, circuit operation is stopped or slowed. Concretely, in the normal mode, the panel driver circuit 16 reads signals from all of the optical sensors 2, the A/D converter 13 converts all sensor output signals into digital values, the recognition processing portion 22 performs recognition processing, and the infrared backlight 19 is lit up. On the other hand, in the standby mode, the panel driver circuit 16 reads signals from some of the optical sensors 2, the A/D converter 13 converts the output signals of these sensors into digital values, the recognition processing portion 22 stops operating, and the infrared backlight 19 is turned off.

To perform mode control as mentioned above, the sensor data processing circuit 14 includes the mode control portion 24, the decimated image memory 25, the control register 26, and the decimated image comparison portion 27. The mode control portion 24 performs a mode determination process for determining whether the mode is normal or standby, a normal mode control process for controlling circuit operation in the normal mode, and a standby mode control process for controlling circuit operation in the standby mode. In transition from the normal mode to the standby mode, the decimated image memory 25 functions as an image storage portion for storing a comparison image based on signals being read from the optical sensors 2.

The control register 26 has stored therein various parameters required for the operation of the mode control portion 24. Concretely, the control register 26 has stored therein, for example, a first threshold $TH_1$, a second threshold $TH_2$, a first timer value $TM_1$, a second timer value $TM_2$, and an extraction range ER. The two thresholds $TH_1$ and $TH_2$ and the two timer values $TM_1$ and $TM_2$ are used in the mode determination process, and the extraction range ER is used in the standby mode control process. The parameters stored in the control register 26 are set by a host via the host I/F portion 23.

In the standby mode, the decimated image comparison portion 27 performs pixel-by-pixel comparison between a decimated image stored in the decimated image memory 25 and a new decimated image generated by averaging decimated images for two frames on the basis of the scan picture outputted by the scan picture generation portion 21, and obtains the number N of pixels whose difference in pixel values is greater than or equal to the first threshold $TH_1$ stored in the control register 26. Moreover, in the normal mode, it is stopped from operating. The configuration of the decimated image comparison portion 27 will be described in detail later.

Note that in the present embodiment, the decimated image comparison portion 27 is described as an element independent of the mode control portion 24, but the mode control portion 24 may perform the entire operation of the decimated image comparison portion 27, so that the decimated image comparison portion 27 can be said to be included in a broad mode control portion. The same can be true in embodiments to be mentioned below.

The number N thus obtained by the decimated image comparison portion 27 is provided to the mode control portion 24, and the mode control portion 24 determines whether or not to cancel the standby mode. The operation of the mode control portion 24, including such a determination operation, will be described in detail with reference to FIG. 7.

1.2 Operation of the Mode Control Portion

Figure 7:
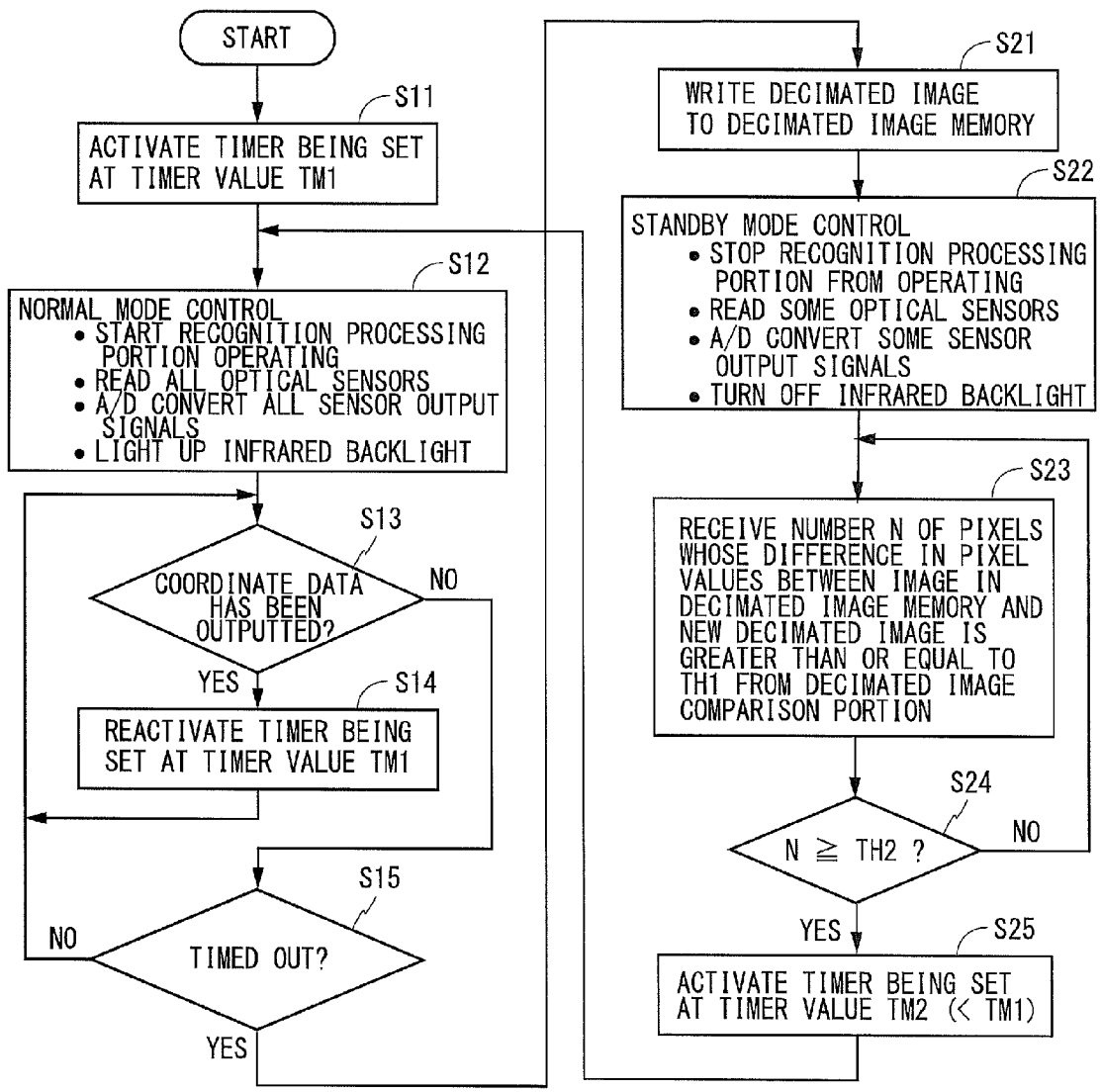
FIG. 7 is a flowchart illustrating the operation of a mode control portion in the embodiment.

FIG. 7 is a flowchart illustrating the operation of the mode control portion 24. The mode control portion 24 initially activates a timer being set at the first timer value $TM_1$ stored in the control register 26 (step S11). Next, the mode control portion 24 performs the normal mode control process (step S12). In step S12, in response to control signals outputted by the mode control portion 24 (the signals being indicated by broken lines in FIG. 1), the recognition processing portion 22 starts operating, the panel driver circuit 16 reads signals from all of the optical sensors 2, the A/D converter 13 converts all sensor output signals into digital values, and the infrared backlight 19 is lit up.

Next, the mode control portion 24 checks whether or not the recognition processing portion 22 has outputted coordinate data Co (step S13). The processing of the mode control portion 24 advances to step S14 when the coordinate data Co has already been outputted or step S15 when the coordinate data Co has not yet been outputted. In the former case, the mode control portion 24 reactivates the timer being set at the first timer value $TM_1$ stored in the control register 26 (step S14), and then proceeds to step S13. In the latter case, the mode control portion 24 checks whether or not the timer has timed out (step S15). When the timer has not yet timed out, the mode control portion 24 proceeds to step S13. When the timer has already timed out, the mode control portion 24 proceeds to step S21 to cause transition from the normal mode to the standby mode.

In transition from the normal mode to the standby mode, the mode control portion 24 generates an image by decimating the pixels from the scan picture (hereinafter, referred to as a decimated image), and writes the decimated image to the decimated image memory 25 (step S21). Next, the mode control portion 24 performs a standby mode control process (step S22). In step S22, in accordance with control signals outputted by the mode control portion 24, the recognition processing portion 22 stops operating, the panel driver circuit 16 reads signals from some of the optical sensors 2, the A/D converter 13 converts the output signals of these sensors into digital values, and the infrared backlight 19 is lit up.

More specifically, the control signals outputted by the mode control portion 24 include a mode control signal indicating whether the mode is normal or standby. The mode control signal MC supplied to the liquid crystal panel 11 is inputted to the sensor row driver circuit 33 and the output control circuit 35, as shown in FIG. 2. In the sensor operation period for the standby mode, the sensor row driver circuit 33 sequentially selects only some of the sensor readout lines $RW_1$ to $RW_m$ and the sensor reset lines $RS_1$ to $RS_m$ pair by pair. At this time, the output control circuit 35 controls the sensor output amplifiers 34 such that only some of them output sensor output signals $SS_1$ to $SS_p$. In addition, the A/D converter 13 converts signals being read from some of the optical sensors 2 into digital signals.

In step S22, the mode control portion 24 may output a control signal indicating the range to be processed, on the basis of the extraction range ER stored in the control register 26. For example, when the extraction range ER stored in the control register 26 indicates the lower half of the display screen, the mode control portion 24 outputs a control signal to the panel driver circuit 16 and the A/D converter 13, indicating that the lower half of the display screen should be processed. The panel driver circuit 16 reads signals from the optical sensors 2 arranged in the lower half of the pixel array 17, on the basis of the control signal. At this time, the A/D converter 13 converts signals being read from the optical sensors 2 into digital signals.

In this manner, the panel driver circuit 16 reads a lesser quantity of signals from the optical sensors 2 in the standby mode than in the normal mode, in accordance with the result of determination by the mode control portion 24. Moreover, the A/D converter 13 performs conversion into digital values less frequently in the standby mode than in the normal mode, in accordance with the result of determination by the mode control portion 24. Consequently, in the standby mode, the scan picture generation portion 21 repeats outputting a decimated image obtained by decimating the pixels from a scan picture outputted in the normal mode. Note that the decimated image outputted in the standby mode is based on signals being read from the same optical sensors 2 from which the signals for generating the decimated image in step S21 are read.

Next, the mode control portion 24 receives from the decimated image comparison portion 27 the number N of pixels whose difference in pixel values between the decimated image stored in the decimated image memory 25 and a new decimated image, which is generated by averaging decimated images for two frames, is greater than or equal to the first threshold $TH_1$ stored in the control register 26 (step S23). The configuration of the decimated image comparison portion 27 for calculating the number N of such pixels will be described in detail later.

Subsequently, the mode control portion 24 compares the number N obtained in step S23 with the second threshold $TH_2$ stored in the control register 26 (step S24). The processing of the mode control portion 24 advances to step S25 where $N \geq TH_2$ or step S23 where $N < TH_2$. In the former case, the mode control portion 24 activates the timer being set at the second timer value $TM_2$ stored in the control register 26 (step S25), and advances to step S12 to cause transition from the standby mode to the normal mode. Note that the second timer value $TM_2$ is assumed to be less than the first timer value $TM_1$.

In this manner, the mode control portion 24 causes transition from the normal mode to the standby mode when a state where no coordinate data Co is outputted lasts for a predetermined period of time (with a lapse of time corresponding to the first timer value $TM_1$). The mode control portion 24 also causes transition from the standby mode to the normal mode when a decimated image supplied anew changes to a predetermined degree or more from the decimated image stored in the decimated image memory 25 (the decimated image being stored at the time of transition from the normal mode to the standby mode). In addition, at the time immediately after transition from the standby mode to the normal mode, the mode control portion 24 causes transition from the normal mode to the standby mode when the state where no coordinate data Co is outputted lasts for a shorter period of time (with a lapse of time corresponding to the second timer value $TM_2$) compared to the case where the normal mode has been maintained for some time. Next, the configuration and operation of the decimated image comparison portion 27 will be described in detail with reference to FIG. 8.

1.3 Configuration and Operation of the Decimated Image Comparison Portion

Figure 8:
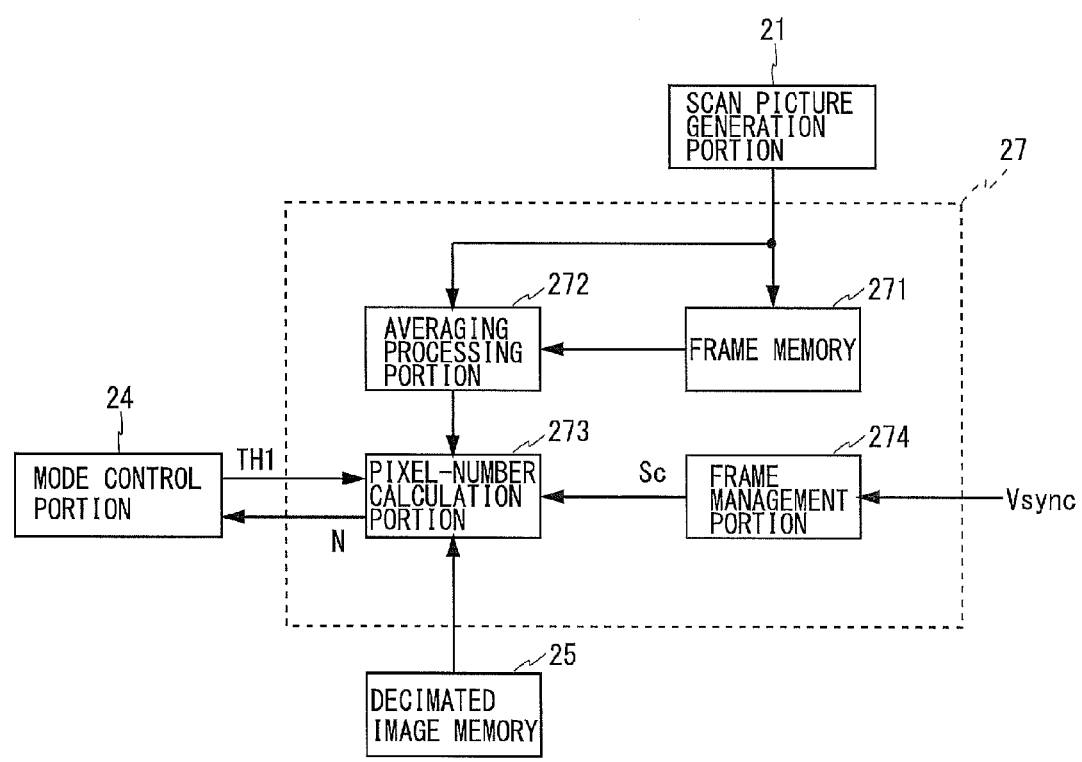
FIG. 8 is a block diagram illustrating a detailed configuration of a decimated image comparison portion in the embodiment.

FIG. 8 is a block diagram illustrating a detailed configuration of the decimated image comparison portion. The decimated image comparison portion 27 shown in FIG. 8 operates only in the standby mode, as described earlier, and includes frame memory 271, an averaging processing portion 272, a pixel-number calculation portion 273, and a frame management portion 274.

The frame memory 271 stores a new decimated image for one frame, which is outputted by the scan picture generation portion 21 in the standby mode as described earlier, and provides the stored image to the averaging processing portion 272 in the next frame.

The averaging processing portion 272 performs processing for pixel-by-pixel averaging of the new decimated image outputted by the scan picture generation portion 21 and the decimated image for the previous frame provided by the frame memory 271. Concretely, this processing averages two frames in terms of detected values being read from the optical sensors 2 and corresponding to the pixel values of the pixels that constitute the decimated image. The averaged pixel values are provided to the pixel-number calculation portion 273. Note that for convenience of explanation, decimated images for two consecutive frames are described here as being averaged collectively, but an average may be calculated and outputted for each pixel.

On the basis of the vertical synchronization signal $V_{sync}$ (including pulses indicating start points of frames) shown in FIG. 3 and included in externally provided signals along with display data $D_1$, the frame management portion 274 detects the initial frame of the standby mode, and keeps providing a cancellation signal $S_c$ to the pixel-number calculation portion 273 from the start to the end of the initial frame. The cancellation signal $S_c$ is intended to prevent erroneous detection by disabling a pixel-number detection operation to be performed by the pixel-number calculation portion 273 as will be described later (specifically, N=0 being outputted).

That is, the decimated image included in the initial frame of the standby mode is the new decimated image that is to be compared by the averaging processing portion 272, but the decimated image stored in the frame memory 271 at the same point in time is an irrelevant decimated image stored immediately before the end of the previous standby mode. Accordingly, it is highly possible that the use of the decimated image stored in the frame memory 271 for the aforementioned calculation results in erroneous detection. However, occurrence of such erroneous detection can be prevented by the cancellation signal Sc. Note that the processing timing of the frame memory 271 and the averaging processing portion 272 may be controlled by the frame management portion 274 detecting the start of each frame.

For the decimated image received from the decimated image memory 25 and stored at the time of transition from the normal mode to the standby mode and the new decimated image obtained by averaging pixel values for two frames and received from the averaging processing portion 272, the pixel-number calculation portion 273 calculates the number N of pixels whose difference in pixel values is greater than or equal to the first threshold $TH_1$ stored in the control register 26, and outputs the number N to the mode control portion 24. Note that, while the cancellation signal $S_c$ from the frame management portion 274 continues to be accepted, i.e., while the decimated image included in the initial frame of the standby mode is targeted for the aforementioned calculation, this calculation processing is cancelled, so that N=0 is outputted to the mode control portion 24. Note that for convenience of explanation, the two decimated images are described again as being collectively targeted for calculation, but the number N may be calculated by calculating the aforementioned difference for each pixel and sequentially counting pixels whose difference is greater than or equal to the first threshold $TH_1$.

In this manner, by the averaging processing portion 272 averaging pixel values for two frames, it is rendered possible to average pixel values corresponding to amounts of light sensed by the optical sensors 2, which might vary between even- and odd-number frames even when the same amount of light can be provided. Consequently, in the case where the pixel values include noise caused by the aforementioned potential fluctuations, the averaging of the pixel values achieves the difference less than the first threshold $TH_1$ even when the pixel values in the even- or odd-number frame alone result in the first threshold $TH_1$ or higher, and therefore, the erroneous sensing due to noise can be reduced or eliminated. Particularly in the case of the drive in which the polarity of the voltage applied to the liquid crystal is reversed every frame as in the present embodiment, the aforementioned averaging processing makes it possible to completely or significantly cancel out the potential fluctuations, thereby considerably reducing or eliminating the erroneous sensing due to noise. In addition, even when only the pixel values that correspond to a specific frame are affected by some unexpected noise, the averaging processing can lessen the influence of the noise.

Note that so long as pixel values for two consecutive frames can be averaged, numerous types of variants can be made to the above configuration, or pixel values for two or more frames may be averaged. For example, averaged pixel values may be written back (or overwritten) to the frame memory 271, thereby averaging average pixel values for decimated images up to the immediately preceding frame and pixel values for the decimated image in the current (present) frame (e.g., with predetermined weighting).

As described above, in the present embodiment, assuming that the first frame is the frame at the time of the decimated image being stored to the decimated image memory 25 (at the time of transition from the normal mode to the standby mode), by taking pixel values for one or more odd-number frames, at least including the third frame, into consideration (in the averaging processing), it is rendered possible to reduce or eliminate the influence of noise. Note that in the case of the drive in which the polarity of the voltage applied to the liquid crystal is reversed every unit period of two or more frames, the influence of noise can be reduced or eliminated as well by considering odd-number unit times as the aforementioned odd-number frames, and this is true for embodiments to be described below.

1.4 Effect

Hereinafter, the effect of the liquid crystal display device 10 according to the present embodiment will be described. The liquid crystal display device 10 according to the present embodiment includes the sensor-embedded liquid crystal panel 11, the panel driver circuit 16, the recognition processing portion 22, the mode control portion 24, and the decimated image memory 25. The mode control portion 24 determines whether the mode is normal or standby, and causes the recognition processing portion 22 to operate in the normal mode and stop operating in the standby mode. In transition from the normal mode to the standby mode, the decimated image memory 25 stores a decimated image, and when a decimated image supplied anew changes to a predetermined degree or more from the decimated image stored in the decimated image memory 25, the mode control portion 24 causes transition from the standby mode to the normal mode. In particular, the mode control portion 24 performs pixel-by-pixel comparison between the decimated image stored in the decimated image memory 25 and an averaged decimated image based on a decimated image supplied anew, and causes transition from the standby mode to the normal mode when the number of pixels whose difference in pixel values is greater than or equal to the first threshold $TH_1$ is greater than or equal to the second threshold $TH_2$.

In this manner, it is determined whether the mode is normal or standby, and the recognition processing portion 22 is stopped from operating in the standby mode, thereby reducing power consumption of the liquid crystal display device 10. Moreover, when the decimated image changes to a predetermined degree or more after transition to the standby mode, the mode transitions to normal, so that the transition to the normal mode can take place before a target touches the screen. Thus, a touch position can be promptly detected after a quick exit from the standby mode. Moreover, by averaging decimated images for two frames for comparison, noise to be caused due to the aforementioned potential fluctuations can be averaged between even- and odd-number frames, thereby reducing or eliminating the erroneous sensing due to noise.

Furthermore, the decimated image has a smaller number of pixels than the scan picture. By using such a decimated image to perform the mode determination process, the size of memory and the amount of computation required for the mode determination process can be reduced. In addition, the decimated image is an image obtained by decimating the pixels from the scan picture. Such a decimated image can be readily generated.

As described above, in the display device with optical sensors of the present invention, power consumption is reduced by stopping or delaying circuit operation in the standby mode, and the erroneous sensing due to noise is reduced or eliminated by the averaging processing, making it possible to promptly detect a touch position after an accurate and quick exit from the standby mode where necessary.

2. Second Embodiment

2.1 Overall Configuration and Operation

The overall configuration of a liquid crystal display device according to a second embodiment of the present invention is almost the same as in the first embodiment shown in FIG. 1, the same elements are denoted by the same reference characters, and any descriptions thereof will be omitted. Moreover, their operation, particularly the operation of the mode control portion 24, are also almost the same as in the first embodiment shown in FIG. 7, and therefore, any descriptions thereof will be omitted.

The decimated image comparison portion 27 of the present embodiment differs from that of the first embodiment in that pixel values are not averaged between even- and odd-number frames, and the number N of pixels is calculated in accordance with whether the frame that corresponds to the decimated image stored in the decimated image memory 25 is even-numbered or odd-numbered. Hereinafter, the configuration and the operation of the decimated image comparison portion 27 will be described in detail with reference to FIG. 9.

2.2 Configuration and Operation of the Decimated Image Comparison Portion

Figure 9:
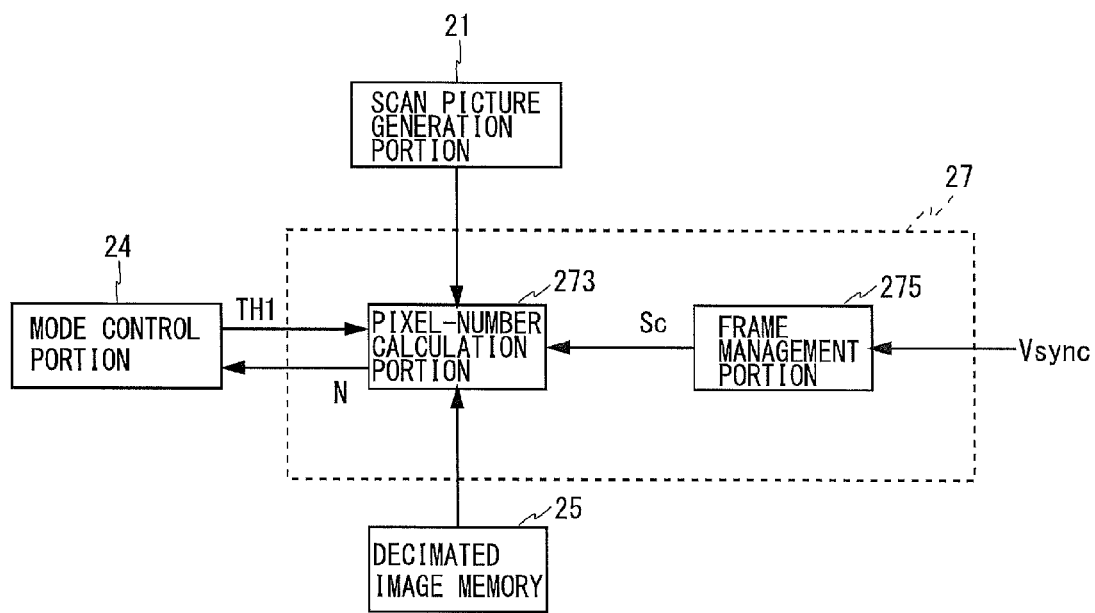
FIG. 9 is a block diagram illustrating a detailed configuration of a decimated image comparison portion of a liquid crystal display device according to a second embodiment of the present invention.

FIG. 9 is a block diagram illustrating a detailed configuration of the decimated image comparison portion. The decimated image comparison portion 27 shown in FIG. 9 operates only in the standby mode, as described earlier in the first embodiment, and includes the pixel-number calculation portion 273 and a frame management portion 275.

On the basis of a vertical synchronization signal $V_{sync}$ (including pulses indicating start points of frames) included in externally provided signals along with display data $D_1$, the frame management portion 275, similar to the frame management portion 274 in the first embodiment, detects the initial frame of the standby mode, and keeps providing a cancellation signal Sc to the pixel-number calculation portion 273 from the start of the initial frame to the next frame (second frame). Thereafter, in each of the fourth, sixth, and subsequent even-number frames, the cancellation signal $S_c$ is continuously provided to the pixel-number calculation portion 273 from the start to the end of that frame. Note that this operation can be readily realized by repeating the cancellation signal $S_c$ being provided to the pixel-number calculation portion 273 for a period of one frame every other frame after the second frame.

As in the first embodiment, the cancellation signal Sc is intended to prevent the initial frame from being used in the aforementioned calculation by the pixel-number calculation portion 273 and also prevent even-number frames from being used in the calculation assuming that the initial frame is a first frame. Here, the even-number frames are irrelevant to the frame structure of the display data $D_1$. The reason for the even-number frames not to be used in the calculation is as follows. Specifically, as a result of the drive in which the polarity of the voltage applied to the liquid crystal is reversed every frame, the potential fluctuations that cause noise occur reversely every even- or odd-number frame (via the aforementioned parasitic capacitance). Consequently, for the same even- or odd-number frames, (when there is no change in the display image) noise including the fluctuations similarly affects pixel values corresponding to amounts of light sensed by the optical sensors 2, but it affects differently for different frames, i.e., combinations of an even-number frame and an odd-number frame, so that the noise affects more when different frames are compared (by the decimated image comparison portion 27). Accordingly, by setting the initial frame as an odd-number frame without using even-number frames in the aforementioned calculation, it is rendered possible to decrease the influence of noise, thereby preventing the aforementioned erroneous detection due to noise.

For the decimated image received from the decimated image memory 25 and stored at the time of transition from the normal mode to the standby mode and the new decimated image received from the scan picture generation portion 21, the pixel-number calculation portion 273 calculates the number N of pixels whose difference in pixel values is greater than or equal to the first threshold $TH_1$ stored in the control register 26, and outputs the number N to the mode control portion 24. Note that, while the cancellation signal $S_c$ from the frame management portion 274 continues to be accepted, i.e., while the decimated image included in the initial frame of the standby mode is targeted for the aforementioned calculation, and also while a decimated image included in any even-number frame is targeted for the aforementioned calculation, this calculation processing is cancelled, so that N=0 is outputted to the mode control portion 24.

In this manner, a new decimated image, which is generated in a frame (here, an even-number frame) different from the frame in which the decimated image stored in the decimated image memory 25 was acquired, is controlled by the frame management portion 275 not to be targeted for the calculation in the pixel-number calculation portion 273, so that the influence of noise due to potential fluctuations can be minimized, thereby reducing or eliminating the erroneous sensing due to noise.

2.3 Effect

As described above, in the display device with optical sensors of the present invention, power consumption is reduced by stopping or delaying circuit operation in the standby mode, and a new decimated image to be targeted for the aforementioned calculation is limited to the same odd-number frame as the frame in which the decimated image stored in the decimated image memory 25 was acquired, so that the erroneous sensing due to noise can be reduced or eliminated with a more simplified configuration, making it possible to promptly detect a touch position after an accurate and quick exit from the standby mode where necessary.

3. Third Embodiment

3.1 Overall Configuration and Operation

Figure 10:
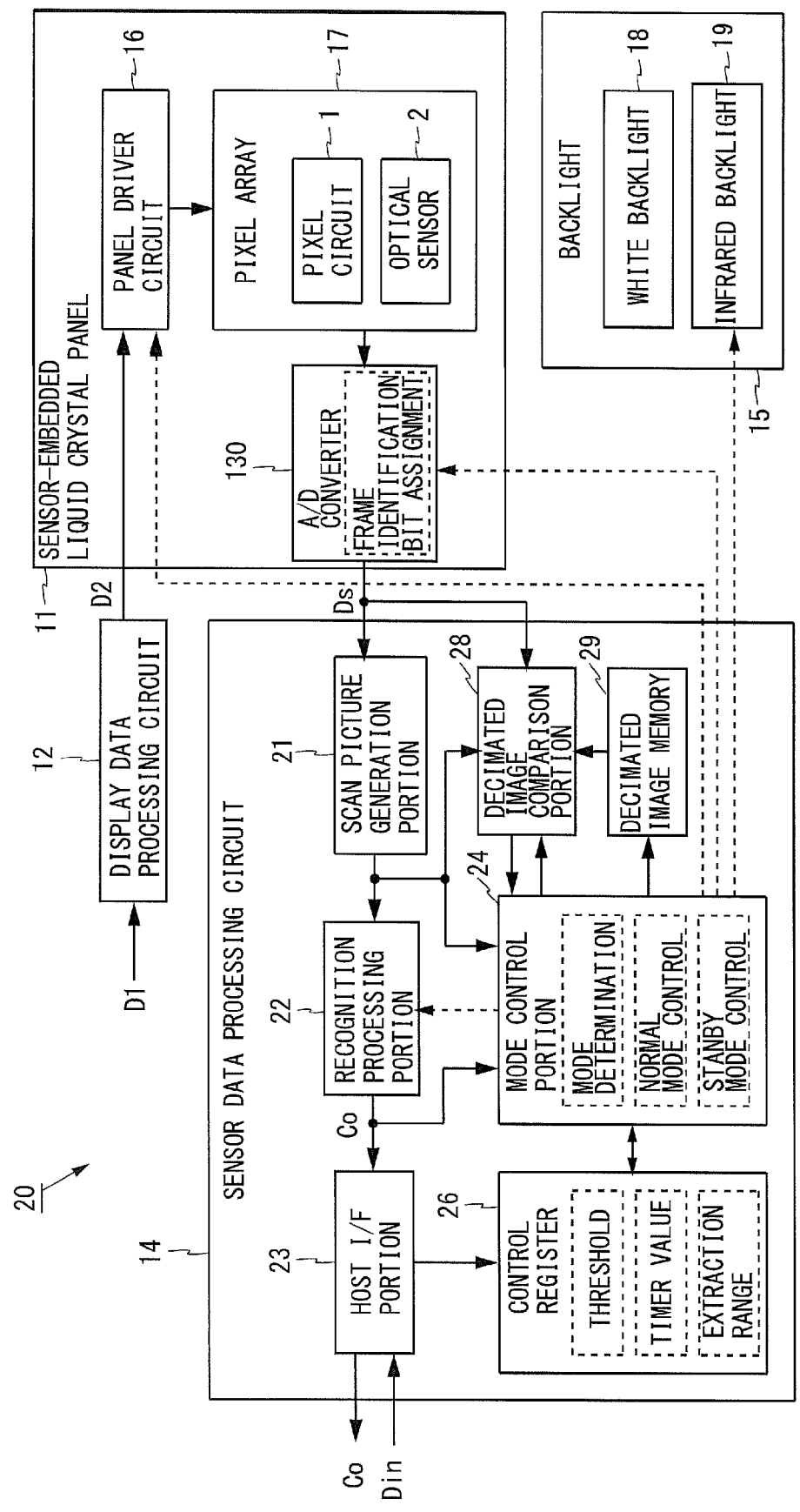
FIG. 10 is a block diagram illustrating the configuration of a liquid crystal display device according to a third embodiment of the present invention.

FIG. 10 is a block diagram illustrating the configuration of a liquid crystal display device according to a third embodiment. The overall configuration of the liquid crystal display device shown in FIG. 10 is almost the same as in the first embodiment shown in FIG. 1, except for an A/D converter 130, a decimated image comparison portion 28, decimated image memory 29, and a mode control portion 24, the same elements are denoted by the same reference characters, and any descriptions thereof will be omitted.

The A/D converter 130 shown in FIG. 10 has a well-known frame-identification-bit assigning function (as provided to a driver circuit chip or suchlike), and as with the A/D converter 13 in the first embodiment, it converts analog sensor output signals from the optical sensors 2 into digital signals, and assigns frame identification bits to the output digital signals for the purpose of identifying whether the current frame is an even-number or odd-number frame. Note that the frame identification bits may be assigned by a circuit different from the A/D converter. Digital signals Ds assigned such frame identification bits are provided to the scan picture generation portion 21 and the decimated image comparison portion 28 within the sensor data processing circuit 14.

Furthermore, in transition from the normal mode to the standby mode, the decimated image memory 29 shown in FIG. 10 stores a comparison image based on signals being read from the optical sensors 2, and then another comparison image based on signals being read from the optical sensors 2 in the next frame, as in the first and second embodiments. The stored comparison images are provided to the decimated image comparison portion 28. The operation of the decimated image comparison portion 28 will be described later after a description regarding the operation of the mode control portion 24 is given first with reference to FIG. 11.

3.2 Operation of the Mode Control Portion

Figure 11:
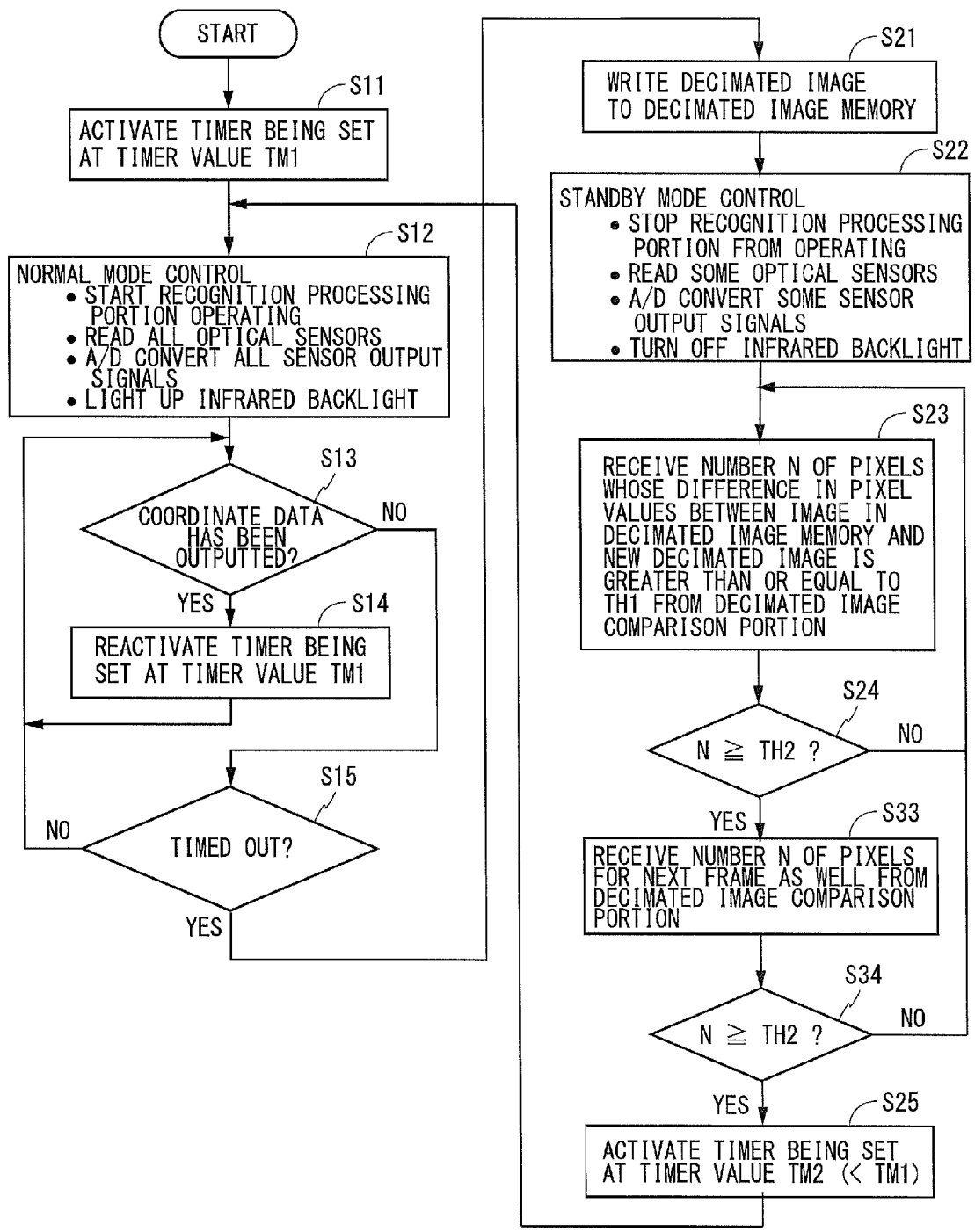
FIG. 11 is a flowchart illustrating the operation of a mode control portion in the liquid crystal display device according to the third embodiment of the present invention.

FIG. 11 is a flowchart illustrating the operation of the mode control portion 24. The details of processing in steps S11 to S24 and S25 shown in FIG. 11 are the same as in FIG. 7 for the first embodiment, the same numbers are assigned to such processing, and any descriptions thereof will be omitted. In the present embodiment, unlike in the first embodiment, the processing of steps S33 and S34 are additionally performed between steps S24 and S25. Moreover, the processing of steps S23 and S24 is the same as in the first embodiment but functions differently. Hereinafter, the flow of processing including the above will be described.

The processing for the standby mode is performed (S22), as mentioned earlier, and thereafter, for a decimated image stored in the decimated image memory 29 and a new decimated image, the mode control portion 24 receives from the decimated image comparison portion 28 the number N of pixels whose difference in pixel values is greater than or equal to the first threshold $TH_1$ stored in the control register 26 (step S23). The details of processing are the same as in the first embodiment, except that the calculation made by the decimated image comparison portion 28 is to obtain the difference in pixel values between the new decimated image and one of two decimated images stored in the decimated image memory 29 that is provided with a classification (hereinafter, referred to as an "even-odd classification") as to whether the current frame is an even-number or odd-number frame. The operation of the decimated image comparison portion 28 will be described later.

Subsequently, the mode control portion 24 compares the number N obtained in step S23 with the second threshold $TH_2$ stored in the control register 26 (step S24). The processing of the mode control portion 24 advances to step S33 where N≥$TH_2$ or step S23 where N<$TH_2$.

Next, in the following frame, the mode control portion 24 performs the same processing as in step S23, i.e., for a decimated image stored in the decimated image memory 29 and a new decimated image, the mode control portion 24 receives from the decimated image comparison portion 28 the number N of pixels whose difference in pixel values is greater than or equal to the first threshold $TH_1$ stored in the control register 26 (step S33). Here, in the calculation made by the decimated image comparison portion 28, the difference in pixel values is obtained for the new decimated image and one of two decimated images stored in the decimated image memory 29 that is provided with an even-odd classification as to the current frame, as described earlier, but the even-odd classification as to the current frame is different from that of step S23.

Subsequently, the mode control portion 24 compares the number N obtained in step S33 with the second threshold $TH_2$ stored in the control register 26 (step S34). The processing of the mode control portion 24 advances to step S25 where N≥$TH_2$ or step S23 where N<$TH_2$. The processing in step S25 and the flow of subsequent processing are the same as in the first embodiment.

In this manner, when a decimated image supplied anew (in a certain frame) changes to a predetermined degree or more from a decimated image stored in the decimated image memory 25 (the decimated image being stored at the time of transition from the normal mode to the standby mode), the mode control portion 24 does not cause immediate transition from the standby mode to the normal mode, but it causes transition from the standby mode to the normal mode when a decimated image similarly supplied anew in the following frame changes to a predetermined degree or more from a decimated image (with an even-odd classification) stored in the decimated image memory 25.

Here, the decimated image comparison portion 28 of the present embodiment differs from that of the second embodiment in that the number N of pixels is calculated separately for cases where frames corresponding to decimated images stored in the decimated image memory 25 are even-number or odd-number frames. Hereinafter, the configuration and operation of the decimated image comparison portion 28 will be described in detail with reference to FIG. 12.

3.3 Configuration and Operation of the Decimated Image Comparison Portion

Figure 12:
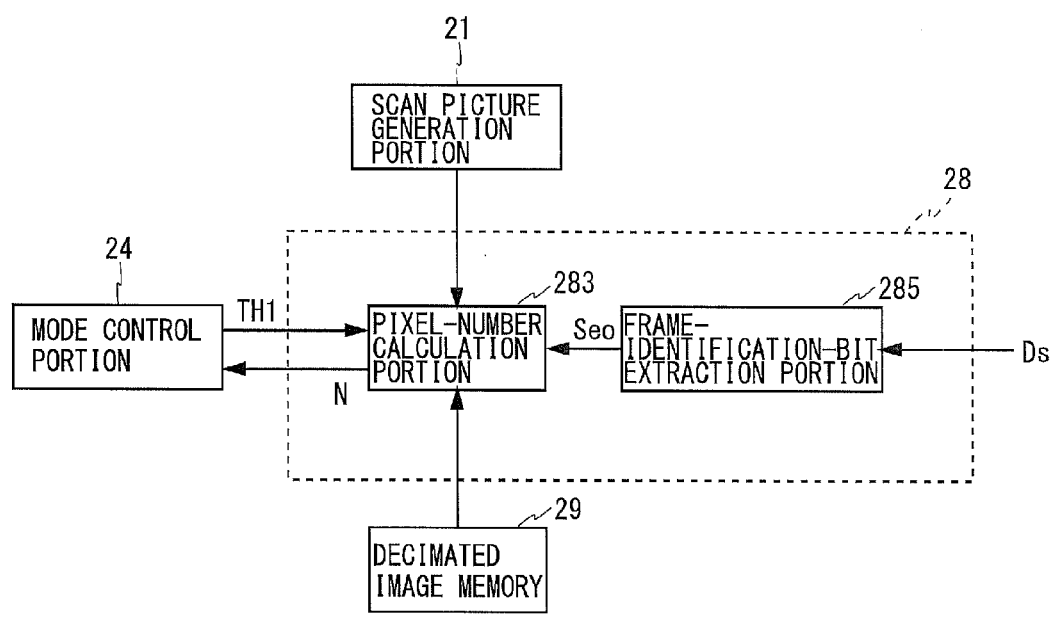
FIG. 12 is a block diagram illustrating a detailed configuration of a decimated image comparison portion in the embodiment.

FIG. 12 is a block diagram illustrating a detailed configuration of the decimated image comparison portion. The decimated image comparison portion 28 shown in FIG. 12 operates only in the standby mode, as described earlier in the first and second embodiments, and includes a pixel-number calculation portion 283 and a frame-identification-bit extraction portion 285.

The frame-identification-bit extraction portion 285 receives a digital signal Ds from the A/D converter 130 shown in FIG. 10, extracts a frame identification bit assigned to the signal, and identifies whether the frame is an even-number or odd-number frame. The identified even-odd classification is provided to the pixel-number calculation portion 283 as an even-odd classification signal $S_{eo}$.

Note that the frame management portion 274 or 275 in the first or second embodiment may determine the even-odd classification of the initial frame in which transition to the standby mode takes place by determining the even-odd classification of a new decimated image corresponding to the current frame, and therefore, these functions can be replaced in part with the function of the frame-identification-bit extraction portion 285.

For a new decimated image received from the scan picture generation portion 21 and a decimated image with an even-odd classification determined as a match (for the current frame) on the basis of the even-odd classification signal $S_{eo}$, which is a decimated image stored either at the time of transition from the normal mode to the standby mode or in the following frame and received from the decimated image memory 29, the pixel-number calculation portion 283 calculates the number N of pixels whose difference in pixel values is greater than or equal to the first threshold $TH_1$ stored in the control register 26, and outputs the number N to the mode control portion 24. Note that, while the decimated image included in the initial frame of the standby mode is targeted for the aforementioned calculation, and also while a decimated image included in any even-number frame is targeted for the aforementioned calculation, this calculation processing is cancelled, so that N=0 is outputted to the mode control portion 24. The canceling operation has the same function and effect as the cancellation signal $S_c$ of the frame management portion 274 or 275 in the first or second embodiment, and therefore, any description thereof will be omitted.

In this manner, a new decimated image, which is generated in a frame different in terms of classification of even or odd from the frame in which the decimated image stored in the decimated image memory 25 was acquired, is controlled by the frame management portion 275 not to be targeted for the calculation in the pixel-number calculation portion 283, so that the influence of noise due to potential fluctuations can be minimized, thereby reducing or eliminating the erroneous sensing due to noise. Moreover, the calculation is made for both an even-number frame and an odd-number frame, and transition from the standby mode to the normal mode takes place when both of the decimated images in the two frames change to a predetermined degree or more, leading to an accurate detection, which makes it possible to more reliably reduce or eliminate erroneous sensing.

However, the calculation may be made either in the even-number frame or the odd-number frame, and transition from the standby mode to the normal mode may take place when the decimated image in that one frame changes to a predetermined degree or more. As a result, it is possible to quickly exit from the standby mode, reduce the decimated image memory 29, and simplify the processing.

3.4 Effect

As described above, in the display device with optical sensors of the present invention, power consumption is reduced by stopping or delaying circuit operation in the standby mode, and the even-odd classification of a new decimated image to be targeted for the aforementioned calculation is calculated so as to accord with the frame in which the decimated image stored in the decimated image memory 25 was acquired, so that the erroneous sensing due to noise can be reliably reduced or eliminated, making it possible to promptly detect a touch position after an accurate and quick exit from the standby mode where necessary.

4. Variants

Numerous types of variants can be made to the liquid crystal display devices according to the above embodiments, so long as an image stored at the time of transition to the standby mode is set as the first, and the next odd-number frame is set as an image for comparison. Such a configuration makes it possible to reduce erroneous determination even in the case where the same amount of light is sensed both in an even-number frame and an odd-number frame but the detected amount of light that corresponds to the potential of node P varies therebetween.

Note that the liquid crystal display device of the present invention may have the function of causing transition from the normal mode to the standby mode (or in a reverse direction) in accordance with a signal inputted from a host. Moreover, the decimated image stored in the decimated image memory 25 may be an image generated at the end of the normal mode or at the beginning of the standby mode, so long as it is stored at the time of transition from the normal mode to the standby mode.

INDUSTRIAL APPLICABILITY

The present invention is applied to image display devices having a plurality of optical sensors provided on their display panels, and is suitable for image display devices, such as liquid crystal display devices, in which a normal mode and a standby mode for reducing power consumption are appropriately switchable therebetween.

DESCRIPTION OF THE REFERENCE CHARACTERS 1 pixel circuit
2 optical sensor
10 liquid crystal display device
11 sensor-embedded liquid crystal panel
12 display data processing circuit
13, 130 A/D converter
14 sensor data processing circuit
15 backlight
16 panel driver circuit
17 pixel array
18 white backlight
19 infrared backlight
21 scan picture generation portion
22 recognition processing portion
23 host I/F portion
24 mode control portion
25, 29 decimated image memory
26 control register
27, 28 decimated image comparison portion
271 frame memory
272 averaging processing portion
273 pixel-number calculation portion
274, 275, 283 frame management portion
285 frame-identification-bit extraction portion

The invention claimed is:

1. A display device provided with a plurality of optical sensors, comprising:
a display panel including two-dimensionally arranged pixel circuits and optical sensors;
a driver circuit for performing operations of writing signals to the pixel circuits in accordance with display data provided at least every unit period and reading signals from the optical sensors in accordance with amounts of received light;
a recognition processing portion for performing recognition processing on a recognition target image based on signals being read from the optical sensors, and outputting coordinate data indicating a position of a sensing target;
a mode control portion for determining whether a mode is normal or standby and causing the recognition processing portion to operate in the normal mode or stop operating in the standby mode; and
an image storage portion for storing a first comparison image based on signals being read from the optical sensors in transition from the normal mode to the standby mode, wherein,
the mode control portion causes transition from the standby mode to the normal mode when a unit period at the time of storage of the first comparison image is considered as a first unit period and a second comparison image based on signals being read from the optical sensors in at least one subsequent odd-number unit period changes to a predetermined degree or more from the first comparison image.

2. The display device according to claim 1, wherein the mode control portion obtains the second comparison image by averaging two or more images based on signals being read from the optical sensors respectively in the at least one odd-number unit period and at least one even-number unit period.

3. The display device according to claim 2, wherein the mode control portion obtains the second comparison image by averaging two images based on signals being read from the optical sensors respectively in two consecutive unit periods.

4. The display device according to claim 1, wherein the mode control portion determines whether or not the second comparison image has changed from the first comparison image every odd-number unit period, the second comparison image being an image based on signals being read from the optical sensors in the odd-number unit period.

5. The display device according to claim 4, wherein,
the image storage portion stores a third comparison image based on signals being read from the optical sensors in a second unit period subsequent to the first unit period, and
the mode control portion causes transition from the standby mode to the normal mode when a fourth comparison image is determined to have changed from the third comparison image to a predetermined degree or more and the second comparison image is determined to have changed from the first comparison image to a predetermined degree or more, the fourth comparison image being an image based on signals being read from the optical sensors in an even-number unit period.

6. The display device according to claim 1, wherein,
the driver circuit outputs an identification bit indicating whether the unit period is even- or odd-numbered, and
the mode control portion identifies whether an image based on signals being read from the optical sensors is for an odd-number unit period, on the basis of the identification bit outputted by the driver circuit.

7. The display device according to claim 1, wherein the mode control portion performs pixel-by-pixel comparison between the first comparison image and the second comparison image, and causes transition from the standby mode to the normal mode when the number of pixels whose difference in pixel values is greater than or equal to a first threshold is greater than or equal to a second threshold.

8. The display device according to claim 1, wherein each of the comparison images has a smaller number of pixels than the recognition target image.

9. The display device according to claim 8, wherein the comparison images are images each being obtained by decimating the pixels from the recognition target image.

10. The display device according to claim 1, wherein the driver circuit reads a lesser quantity of signals from the optical sensors in the standby mode than in the normal mode in accordance with a result of determination by the mode control portion.

11. A method for controlling a display device provided with a display panel including two-dimensionally arranged pixel circuits and optical sensors, and a recognition processing portion for performing recognition processing on a recognition target image based on signals being read from the optical sensors and outputting coordinate data indicating a position of a sensing target, the method comprising:
a step of writing signals to the pixel circuits in accordance with display data;
a step of reading signals from the optical sensors in accordance with amounts of received light;
a step of determining whether a mode is normal or standby;
a step of activating the recognition processing portion in the normal mode or stopping the recognition processing portion from operating in the standby mode; and
a step of storing a first comparison image based on signals being read from the optical sensors in transition from the normal mode to the standby mode, wherein,
in the step of determining the mode, transition from the standby mode to the normal mode takes place when a unit period at the time of storage of the first comparison image is considered as a first unit period and a second comparison image based on signals being read from the optical sensors in at least one subsequent odd-number unit period changes to a predetermined degree or more from the first comparison image.

* * * * *